(12) United States Patent
Harada et al.

(10) Patent No.: US 10,749,169 B2
(45) Date of Patent: Aug. 18, 2020

(54) ACTIVE MATERIAL, ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki-shi (JP)

(72) Inventors: Yasuhiro Harada, Isehara (JP); Norio Takami, Yokohama (JP); Keigo Hoshina, Yokohama (JP); Kazuomi Yoshima, Yokohama (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 15 days.

(21) Appl. No.: 16/288,148

(22) Filed: Feb. 28, 2019

(65) Prior Publication Data
US 2020/0091502 A1    Mar. 19, 2020

(30) Foreign Application Priority Data

Sep. 18, 2018   (JP) .................................. 2018-173405

(51) Int. Cl.
*H01M 4/36*    (2006.01)
*H01M 10/42*   (2006.01)
(Continued)

(52) U.S. Cl.
CPC .............. *H01M 4/364* (2013.01); *B60K 6/28* (2013.01); *B60L 50/64* (2019.02);
(Continued)

(58) Field of Classification Search
None
See application file for complete search history.

(56) References Cited

U.S. PATENT DOCUMENTS

| 10,056,615 B2 | 8/2018 | Ise et al. |
| 2016/0276662 A1 | 9/2016 | Ise et al. |

(Continued)

FOREIGN PATENT DOCUMENTS

| EP | 3 070 056 A1 | 9/2016 |
| JP | 2010-287496 | 12/2010 |
| JP | 5925845 | 5/2016 |
| JP | 2016-177972 | 10/2016 |

OTHER PUBLICATIONS

D. Chen, et al., "Unraveling the Nature of Anomalously Fast Energy Storage in T—$Nb_2O_5$", Journal of the American Chemical Society, vol. 139, 2017, pp. 7071-7081.

(Continued)

*Primary Examiner* — Christopher P Domone
(74) *Attorney, Agent, or Firm* — Oblon, McClelland, Maier & Neustadt, L.L.P.

(57) ABSTRACT

According to one embodiment, an active material is provided. The active material includes a first phase including a niobium-titanium composite oxide, and a second phase adjacent to the first phase and including an orthorhombic niobium oxide. The active material is a particle in which a second (010) plane of the orthorhombic niobium oxide is in contact with a first (010) plane of the niobium-titanium composite oxide in at least a part of a contact interface between the first phase and the second phase.

13 Claims, 9 Drawing Sheets

(51) Int. Cl.
*H01M 2/10* (2006.01)
*H01M 4/485* (2010.01)
*H01M 4/48* (2010.01)
*B60L 50/64* (2019.01)
*B60K 6/28* (2007.10)
*H01M 4/02* (2006.01)

(52) U.S. Cl.
CPC ......... *H01M 2/1077* (2013.01); *H01M 4/483* (2013.01); *H01M 4/485* (2013.01); *H01M 10/425* (2013.01); *B60Y 2200/91* (2013.01); *B60Y 2200/92* (2013.01); *B60Y 2400/112* (2013.01); *H01M 2004/027* (2013.01); *H01M 2010/4271* (2013.01); *H01M 2220/20* (2013.01)

(56) References Cited

U.S. PATENT DOCUMENTS

2017/0077504 A1* 3/2017 Ise .................. H01M 4/366
2017/0207456 A1* 7/2017 Liu .................. H01M 4/366

OTHER PUBLICATIONS

M. Gasperin, "Affinement de la structure de $TiNb_2O_7$ et repartition des cations", Journal of Solid State Chemistry 53, 1984, pp. 144-147.

G. Zhao, et al., "T—$Nb_2O_5$ quantum dots prepared by electrodeposition for fast Li ion intercalation/deintercalation", Nanotechnology, vol. 28, No. 21, 215401, 2017, 7 pages.

\* cited by examiner

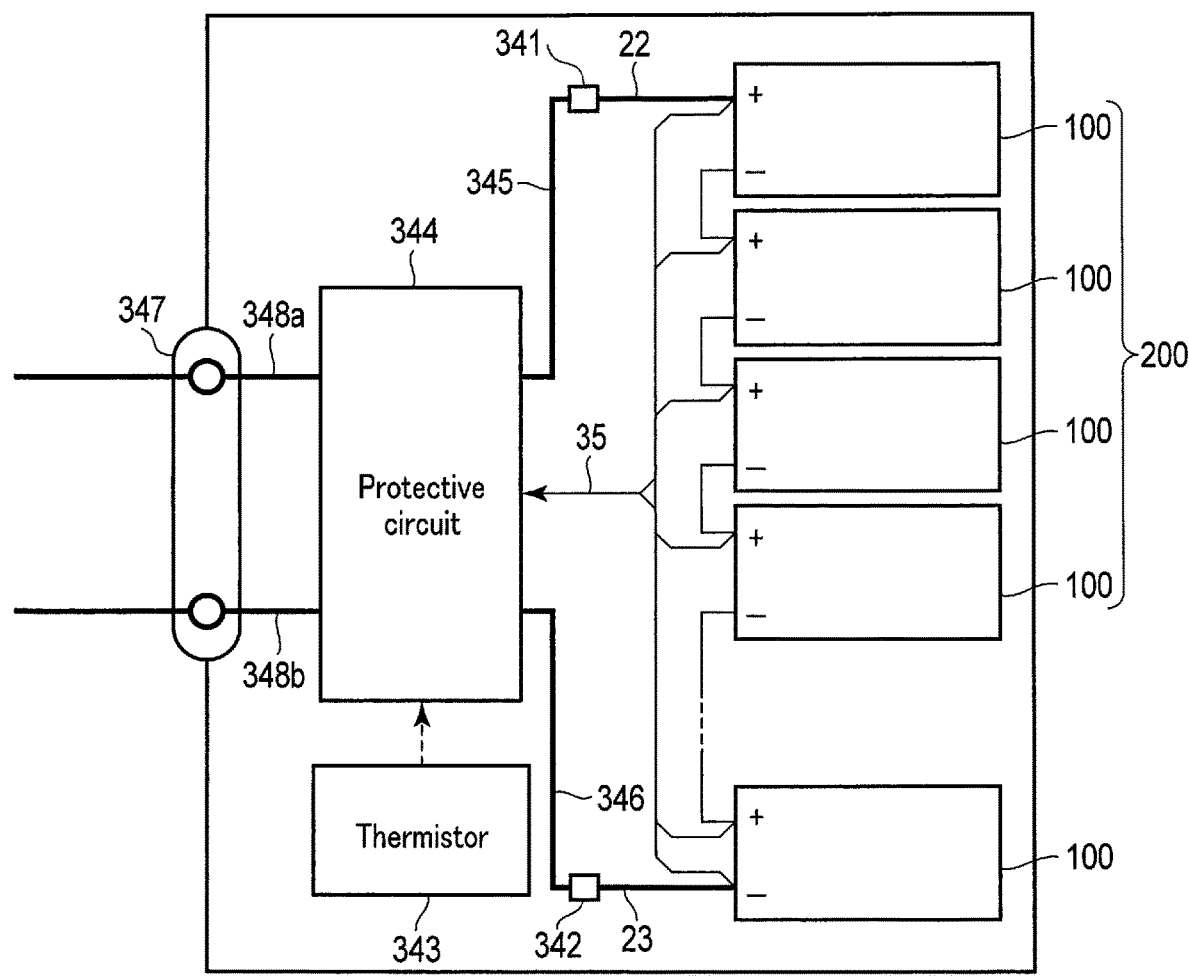
F I G. 12
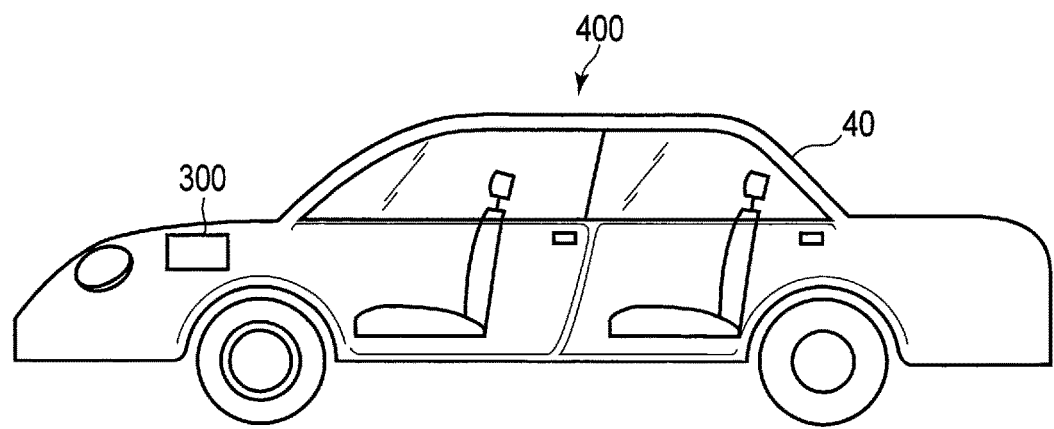
F I G. 13

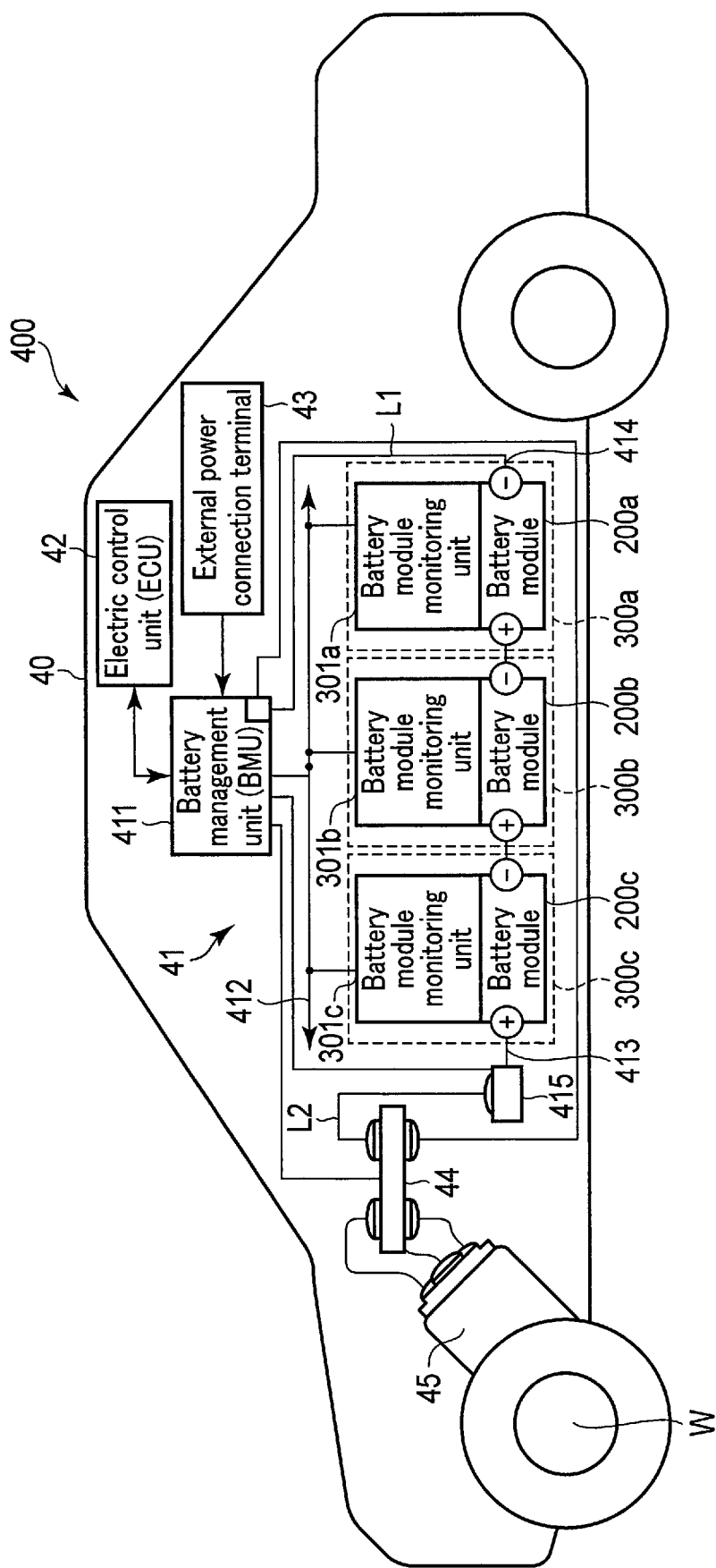
F I G. 14

ACTIVE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-173405, filed Sep. 18, 2018, the entire content of which is incorporated herein by reference.

FIELD

Embodiments described herein relate generally to an active material, an electrode, a secondary battery, a battery pack, and a vehicle.

BACKGROUND

In recent years, as a high energy density battery, secondary batteries such as a lithium-ion secondary battery or a nonaqueous electrolyte secondary battery have been developed. The secondary battery is anticipated for use as a power source for vehicles such as a hybrid electric automobile and an electric automobile, or as a large-sized power source for power storage. When the secondary battery is used as the power source for vehicles, the secondary battery is demanded to achieve rapid charge/discharge performance and long-term reliability or the like in addition to the high energy density.

Rapid charge and discharge is enabled by lithium ions and electrons rapidly moving respectively through an electrolyte and an external circuit between a positive electrode and a negative electrode that are able to have lithium ions and electrons be inserted and extracted. The battery capable of performing rapid charge/discharge has the advantage that a charging time is considerably short. When the battery capable of performing rapid charge/discharge is used as the power source for vehicles, the motive performances of the automobile can be improved, and the regenerative energy of power can be efficiently recovered.

A carbon-based negative electrode using a carbonaceous material such as graphite as a negative electrode active material is used as a negative electrode, which can have lithium ions and electrons be inserted and extracted. However, when rapid charge and discharge is repeated in a battery including the carbon-based negative electrode, dendrites of metallic lithium may precipitate on the negative electrode. The dendrites of metal lithium may cause an internal short circuit. Therefore, when the rapid charge and discharge is repeated in the battery including the carbon-based negative electrode, a concern is raised that heat generation and ignition may occur.

Therefore, a battery including a negative electrode using a metal composite oxide as the negative electrode active material in place of the carbonaceous material has been developed. In particular, in a battery using a titanium oxide as the metal composite oxide for the negative electrode active material, the dendrites of metal lithium are less likely to precipitate even when rapid charge/discharge is repeated as compared with those of the battery including the carbon-based negative electrode. The battery using the titanium oxide has more stable rapid charge/discharge and a longer life than those of the battery including the carbon-based negative electrode.

However, the titanium oxide has a higher (more noble) potential relative to lithium metal than that of the carbonaceous material. On top of that, the titanium oxide has a lower theoretical capacity per unit mass than that of the carbonaceous material. Therefore, there is a problem that the battery including a negative electrode using the titanium oxide as the negative electrode active material has a lower energy density than that of the battery including the carbon-based negative electrode.

In view thereof, a new electrode material containing titanium and niobium has been considered. In particular, in a monoclinic niobium-titanium composite oxide represented by $Nb_2TiO_7$, while tetravalent titanium ions are reduced to trivalent titanium ions when lithium ions are inserted, pentavalent niobium ions are reduced to trivalent niobium ions, also. Therefore, this monoclinic niobium-titanium composite oxide can maintain the electric neutrality of a crystal structure even when many lithium ions are inserted, as compared with the titanium oxide. As a result, the monoclinic niobium-titanium composite oxide represented by $Nb_2TiO_7$ has a high theoretical capacity of 387 mAh/g.

BRIEF DESCRIPTION OF THE DRAWINGS

FIG. 12 is a block diagram showing an example of an electric circuit of the battery pack shown in FIG. 11;

FIG. 13 is a cross-sectional view schematically showing an example of a vehicle according to an embodiment; and FIG. 14 is a diagram schematically showing another example of the vehicle according to the embodiment.

DETAILED DESCRIPTION

Figure 1:
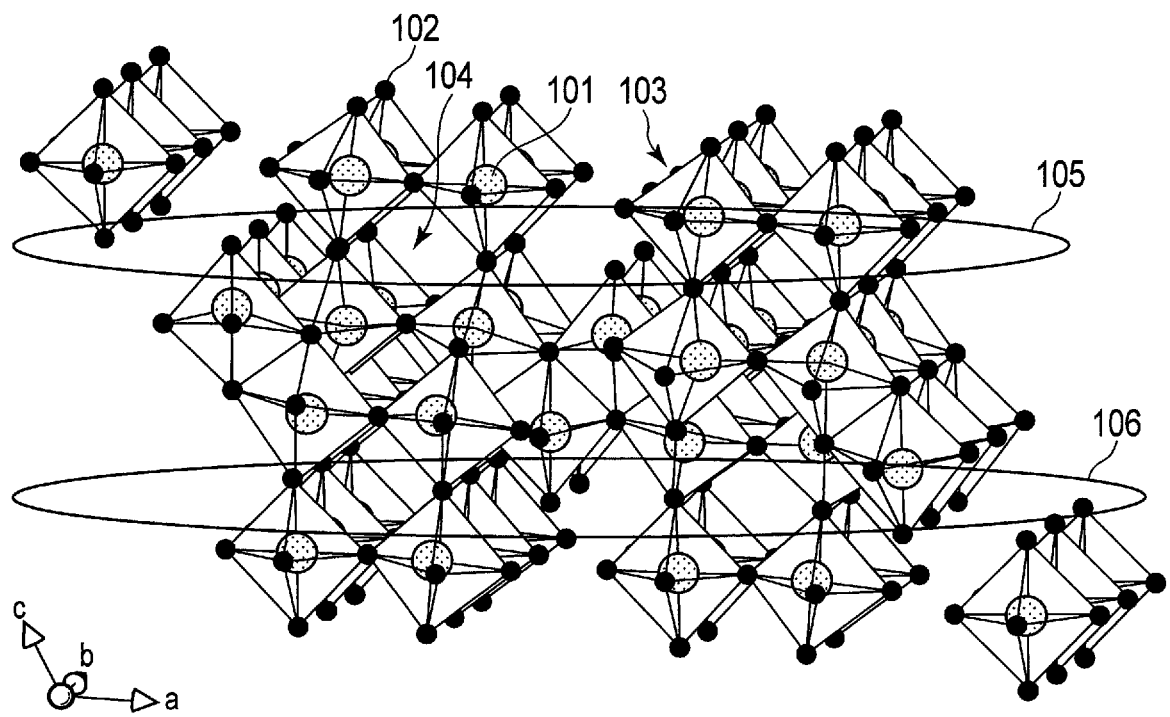
FIG. 1 is a schematic view illustrating a crystal structure of a niobium-titanium composite oxide $Nb_2TiO_7$.

According to one embodiment, an active material is provided. The active material includes a first phase including a niobium-titanium composite oxide, and a second phase adjacent to the first phase and including an orthorhombic niobium oxide. The active material is a particle in which a second (010) plane of the orthorhombic niobium oxide is in contact with a first (010) plane of the niobium-titanium composite oxide in at least a part of a contact interface between the first phase and the second phase.

According to another embodiment, an electrode is provided. The electrode includes the active material according to the above embodiment.

According to a further other embodiment, a secondary battery is provided. The secondary battery includes a negative electrode, a positive electrode, and an electrolyte. The negative electrode is the electrode according to the above embodiment.

According to yet another embodiment, a battery pack is provided. The battery pack includes the secondary battery according to the above embodiment.

According to still another embodiment, a vehicle is provided. The vehicle includes the battery pack according to the above embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, provided is an active material including a first phase and a second phase. The first phase includes a niobium-titanium composite oxide. The second phase is adjacent to the first phase and includes an orthorhombic niobium oxide. The active material is a particle where, in at least a part of a contact interface between the first phase and the second phase, a second (010) plane of the orthorhombic niobium oxide is in contact with a first (010) plane of the niobium-titanium composite oxide.

The above active material can realize a secondary battery that is able to exhibit excellent energy density and excellent pulse input-output performance. Reasons therefor are explained.

First, the first phase will be described.

The first phase, which is the main phase in the active material according to the embodiment, includes a niobium-titanium composite oxide whose representative composition is expressed as $Nb_2TiO_7$. The composition of the niobium-titanium composite oxide is not limited to $Nb_2TiO_7$, but the niobium-titanium composite oxide preferably has a crystal structure having a symmetry of the space group C2/m and an atomic coordination described in Journal of Solid-State Chemistry 53, pp. 144-147 (1984).

The niobium-titanium composite oxide primarily has a monoclinic crystal structure. As an example, schematic views of the crystal structure of monoclinic $Nb_2TiO_7$ are illustrated in FIGS. 1 and 2.

Figure 2:
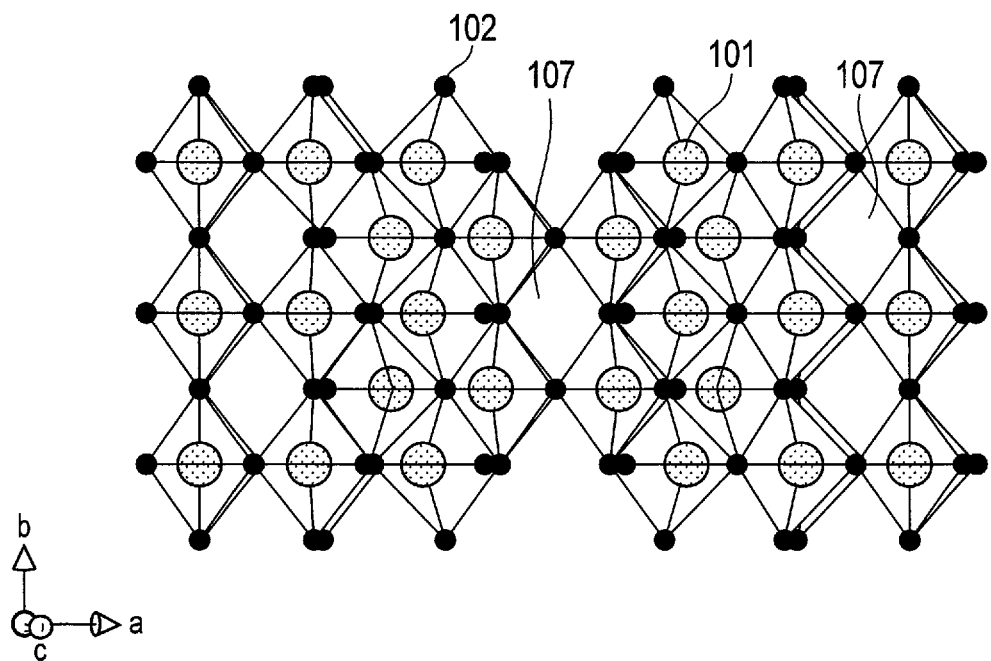
FIG. 2 is a schematic view illustrating the crystal structure of FIG. 1 from another direction.

As shown in FIG. 1, in the crystal structure of monoclinic $Nb_2TiO_7$, a metal ion 101 and an oxide ion 102 form a framework structure 103. As the metal ion 101, Nb ions and Ti ions are arranged at random in the following ratio; Nb:Ti=2:1. Such framework structures 103 are alternately arranged three-dimensionally, thereby vacancies 104 are formed among the framework structure 103. These vacancies 104 serve as hosts for lithium ions. Lithium ions can be inserted in this crystal structure from 0 moles up to a maximum of 5.0 moles. Therefore, the composition when 0 moles to 5.0 moles of lithium ions are inserted can be expressed as $Li_xNb_2TiO_7$ ($0 \leq x \leq 5$).

In FIG. 1, regions 105 and 106 are sections having two-dimensional channels in [100] and [010] directions. As shown in FIG. 2, the crystal structure of monoclinic $Nb_2TiO_7$ has a vacancy 107 along a [001] direction. This vacancy 107 has a tunnel structure advantageous for lithium ion conduction and serves as an electrically conductive path in a [001] direction connecting region 105 and region 106. This electrically conductive path makes it possible for the lithium ions to migrate between regions 105 and 106. Further, the niobium-titanium composite oxide has a lithium insertion potential of about 1.5 V (vs. Li/Li$^+$). Therefore, an electrode including an active material that includes the niobium-titanium composite oxide can realize a battery that can stably repeat charging and discharging that is overall rapid.

Moreover, when a lithium ion is inserted into a vacancy 104, a metal ion 101, which structure the framework, is reduced to a valence of three, thereby maintaining electric neutrality of a crystal. In niobium-titanium composite oxide, not only can Ti ions be reduced from tetravalent to trivalent, but also Nb ions can be reduced from pentavalent to trivalent. Therefore, the number of reduced valences per active material weight is large. Therefore, the niobium-titanium composite oxide can maintain electric neutrality of the crystal even if many lithium ions are inserted. Thus, energy density is higher in the niobium-titanium composite oxide as compared to that in a compound such as titanium oxide only containing tetravalent cations.

Next, the second phase will be described.

Figure 3:
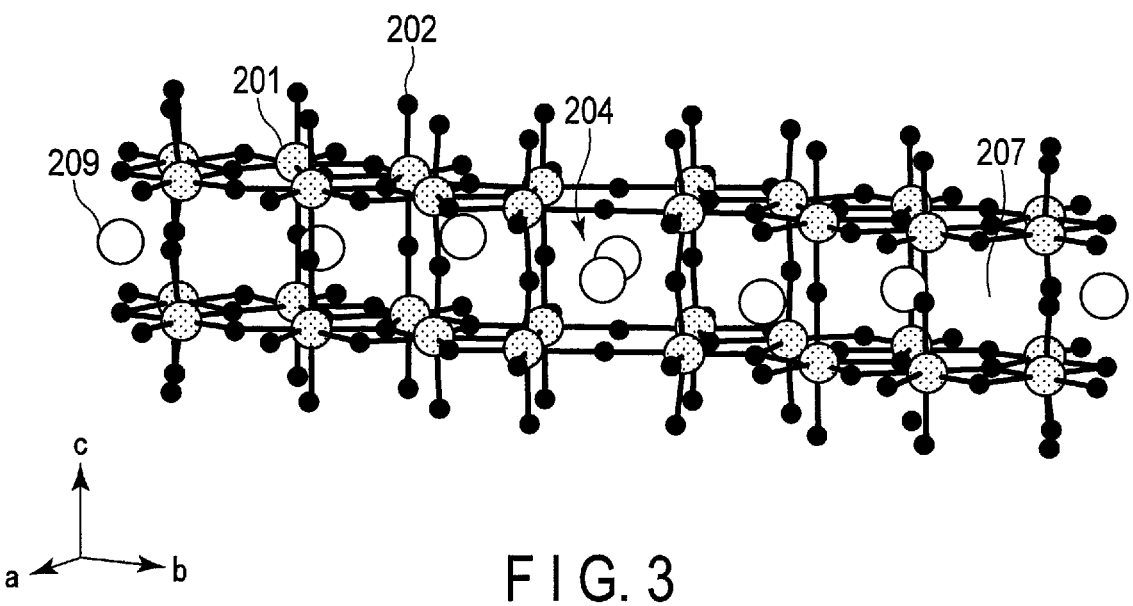
FIG. 3 is a schematic view illustrating a crystal structure of an orthorhombic niobium oxide $T-Nb_2O_5$.

The second phase includes an orthorhombic niobium oxide T-$Nb_2O_5$. A schematic view of the crystal structure of T-$Nb_2O_5$ is illustrated in FIG. 3. As illustrated in FIG. 3, the basic frame structure of orthorhombic T-$Nb_2O_5$ is composed of niobium atoms 201 and oxygen atoms 202. The crystal structure of orthorhombic T-$Nb_2O_5$ preferably belongs to a space group Pbam.

T-$Nb_2O_5$ has insertion sites 204 into which lithium ions 209 can be inserted in the crystal structure. Therefore, even with T-$Nb_2O_5$ alone, charge and discharge are possible as with the niobium-titanium composite oxide. That is, the second phase is also involved in the charge and discharge. On the other hand, the energy density of T-$Nb_2O_5$ alone is not so high as compared with the niobium-titanium composite oxide.

In addition, the crystal structure of T-$Nb_2O_5$ has a continuous vacancy 207 along a b axis, thereby forming an excellent lithium ion conduction path. Therefore, with T-$Nb_2O_5$, lithium ions can be very rapidly taken into and out from the crystal, as compared with the niobium-titanium composite oxide.

The first phase and the second phase are adjacent to each other. At least a part of the first (010) plane of the niobium-titanium composite oxide included in the first phase is located at the contact interface between the first phase and the second phase. In at least a part of the contact interface between the first phase and the second phase, the second (010) plane of the orthorhombic niobium oxide T-$Nb_2O_5$ included in the second phase is in contact with the first (010) plane of the niobium-titanium composite oxide of the first phase located there, thereby constituting particles of the active material. Since the second (010) plane of T-$Nb_2O_5$ is in contact with the first (010) plane of the niobium-titanium composite oxide, the lithium ion conduction path of T-$Nb_2O_5$ is arranged orthogonal to the niobium-titanium composite oxide. Therefore, it is possible to insert and extract a large number of lithium ions into and out from the active material particles in a short time. Therefore, significant improvement in pulse input-output performance, for example, input-output performance at pulses of 10 seconds or less, can be expected.

It is to be noted that the first (010) plane of the niobium-titanium composite oxide refers to a crystal plane orthogonal to the [010] direction in the crystal structure of the niobium-titanium composite oxide. Similarly, the second (010) plane of the orthorhombic niobium oxide refers to a crystal plane orthogonal to the [010] direction in the crystal structure of the orthorhombic niobium oxide.

In the active material according to the embodiment, not only are the first phase and the second phase merely adjacent to each other, but lattice matching is present between the first (010) plane and the second (010) plane in at least a part of the contact interface between the first phase and the second phase. If the phases are merely adjacent to each other, vacancy may be formed at the contact interface; however, there is no vacancy at the contact interface where lattice matching has occurred. In the portion where the crystal planes match each other in this way, it can be said that the excellent lithium ion conduction path of T-Nb$_2$O$_5$ is connected to the lithium ion host site in the niobium-titanium composite oxide, with the conduction path directed straight toward the host site. Preferably, the first phase and the second phase are crystallographically bonded at the location. As a result, lithium can smoothly move between the first phase and the second phase. That is, since the active material is a particle formed by contacting the second (010) plane with the first (010) plane at the contact interface between the first phase and the second phase, high pulse input-output performance can be exhibited. It is to be noted that, in such particles, 25% or more of the first (010) planes located in the contact interface between the first phase and the second phase may be in contact with the second (010) plane.

In addition, the lattice expansion ratio of the niobium-titanium composite oxide accompanying lithium insertion and the rate of change in the c-axis direction of the orthorhombic T-Nb$_2$O$_5$ due to lithium insertion are virtually of the same degree. From this, it is difficult for T-Nb$_2$O$_5$ to separate from the surface of the niobium-titanium composite oxide. Therefore, the first phase and the second phase are hardly separated from each other even when lithium ions are repeatedly inserted and extracted, and the long life is exhibited.

The niobium titanium composite oxide included in the first phase can be represented, for example, by a general formula Li$_x$Ti$_{1-y}$M1$_y$Nb$_{2-z}$M2$_z$O$_7$. In the general formula, $0 \leq x \leq 5$, $0 \leq y < 1$, and $0 \leq z < 1$ hold. The elements M1 and M2 are respectively and independently at least one selected from the group consisting of V, Ta, Fe, Bi, P, Cr, Mo, W, B, K, Na, Mg, Al, and Si.

The element M1 and the element M2 may be the same element, or may be different elements from each other. As represented by the general formula, the element M1 may be a substituent element substituting a part of the Ti atom of TiNb$_2$O$_7$ and disposed at the Ti site. The element M2 may be a substituent element substituting a part of the Nb atom of TiNb$_2$O$_7$ and disposed at the Nb site.

As element M1, it is preferable to use at least one selected from the group consisting of Cr, Fe and Al, for the following reason. These elements are trivalent elements. Therefore, the use of these elements as element M1 makes it possible to improve the electron conductivity of the monoclinic niobium-titanium composite oxide. Therefore, the use of these elements as element M1 makes it possible to improve the capacity and rapid charge/discharge performance of the battery.

From the viewpoint of improving electron conductivity, it is more preferable to use at least one selected from the group consisting of V, Ta, Bi and P as element M1. Since these elements are pentavalent elements, the electron conductivity of the monoclinic niobium-titanium composite oxide can be further improved.

Other than that, it is preferable to use as element M1, at least one selected from the group consisting of B, K, Na, Mg, and Si, for the following reason. The atomic weights of these elements are smaller than the atomic weight of Ti. Therefore, the use of these elements as element M1 makes it possible to increase the capacity of the battery.

As element M2, it is preferable to use at least one selected from the group consisting of Mo, and W. Since these elements are hexavalent elements, the electron conductivity of the monoclinic niobium-titanium composite oxide can be improved.

When Ta is used as element M2, there can be obtained a monoclinic niobium-titanium composite oxide having equivalent performance as that in the case of using Nb as element M2. This is considered to be because Nb and Ta have similar physical, chemical, and electrical properties.

When at least one selected from the group consisting of Mo, W, and V is used as elements M1 and M2, the following advantages can also be obtained. These elements exhibit an effect as a sintering auxiliary agent. Therefore, the use of these elements as at least one of M1 and M2 makes it possible to lower a firing temperature in producing the monoclinic niobium-titanium composite oxide.

The niobium titanium composite oxide of the first phase can also be represented by the general formula Li$_x$Ti$_{1-y}$M$_y$Nb$_2$O$_7$ ($0 \leq x \leq 5$, $0 \leq y < 1$). M in the general formula is the same as M1 described above.

The content of elements M1 and M2 in the compound represented by the general formula Li$_x$Ti$_{1-y}$M1$_y$Nb$_{2-z}$M2$_z$O$_7$ and the content of element M in the compound represented by the general formula Li$_x$Ti$_{1-y}$M$_y$Nb$_2$O$_7$ can be quantified, for example, by Inductively Coupled Plasma (ICP) spectroscopic analysis.

Note that, during the preparation of the monoclinic niobium-titanium composite oxide, oxygen defects may occur in raw materials or intermediate products. An oxide obtained in such a case may be represented by a general formula Li$_x$Ti$_{1-y}$M1$_y$Nb$_{2-z}$M2$_z$O$_{7+\delta}$ ($0 \leq x \leq 5$, $0 \leq y < 1$, $0 \leq z < 1$, $-0.3 \leq \delta \leq 0.3$). Inevitable impurities contained in the raw material as well as impurities that may become mixed-in during the preparation may be present in the composite oxide. Due to such unavoidable factors like the oxygen defects and impurities, a monoclinic niobium-titanium composite oxide including an oxide having a composition beyond the stoichiometric ratio represented by Li$_x$Ti$_{1-y}$M1$_y$Nb$_{2-z}$M2$_z$O$_7$ ($0 \leq x \leq 5$, $0 \leq y < 1$, $0 \leq z < 1$,) may become prepared in some cases. The oxide having a composition beyond the above stoichiometric ratio has excellent lithium ion insertion stability as with an oxide having a composition having the above stoichiometric ratio. Therefore, even when the monoclinic niobium-titanium composite oxide contains the oxide having a composition beyond the stoichiometric ratio, the influence on the lithium ion insertion ability is small.

The monoclinic niobium-titanium composite oxide may contain different phases with Nb/Ti ratios different from the above stoichiometric ratio. Examples of such different phases include Rutile TiO$_2$, Nb$_{24}$TiO$_{62}$, Nb$_{14}$TiO$_{37}$, and $Nb_{10}Ti_2O_{29}$. Note that compositions when lithium ions are inserted into these different phases can be respectively represented as $Li_xTiO_2$ ($0 \leq z \leq 1$), $Li_xNb_{24}Ti_2O_{64}$ ($0 \leq x \leq 49$), $Li_xNb_{14}Ti_2O_{37}$ ($0 \leq x \leq 29$), and $Li_xNb_{10}Ti_2O_{29}$ ($0 \leq x \leq 2$).

The crystal of the monoclinic niobium titanium composite oxide preferably has growth in the [001] direction. When the niobium-titanium composite oxide in the first phase is grown in the [001] direction, there is increase in the first (010) planes arranged outside the first phase. Then, in the contact interface between the first phase and the second phase, portions where the first (010) plane is the interface on the first phase side tends to increase. As a result, since portions where the second (010) plane is in contact with the first (010) plane tends to increase, the contact probability between the first (010) plane and the second (010) plane at the contact interface is high. In the crystal structure of the niobium-titanium composite oxide, when the crystallite diameter related to the (001) plane is larger than the average value of the crystallite diameters related to the other plane indexes, it can be determined that the niobium-titanium composite oxide is grown in the [001] direction. Details of the measurement of the crystallite diameter will be described later.

In the second phase, the orthorhombic niobium oxide $T-Nb_2O_5$ is preferably contained in an amount within the range of 0.1% by mass to 30% by mass with respect to the total amount of the active material (the total amount of the first phase and the second phase). When the amount of $T-Nb_2O_5$ is less than 0.1% by mass, there is hardly any improvement in input-output at pulses of 10 seconds or less. When the amount of $T-Nb_2O_5$ exceeds 30% by mass, the energy density becomes low. The amount of $T-Nb_2O_5$ is more preferably within the range of 1% by mass to 20% by mass.

Next, a form, a particle diameter, and a specific surface area of the active material according to the embodiment will be described.

<Form>

The form of the active material according to the embodiment (material including the first phase and the second phase) is not particularly limited. The active material may take the form of, for example, primary particles, and also may take the form of secondary particles obtained by agglomeration of primary particles. The active material may be a mixture of primary particles and secondary particles. Primary particle as referred to herein may be, for example, a latter described composite oxide particle including a core portion and a shell portion.

The first phase may include particle(s) of the niobium-titanium composite oxide. The first phase may be primary particle(s) of the niobium-titanium composite oxide. Furthermore, the first phase may be secondary particle(s) of the niobium-titanium composite oxide where plural of the primary particles are agglomerated. The first phase is preferably a primary particle composed of niobium-titanium composite oxide. When the first phase is the primary particle, it is possible to secure many contact interfaces between the first phase and the second phase.

More preferably, the active material is a composite particle that includes a core portion including the first phase and a shell portion including the second phase. In the composite particle, the shell portion is located on the surface of the core portion. More preferably, the core portion is composed of a primary particle of the niobium-titanium composite oxide, and the shell portion is a phase composed of orthorhombic niobium oxide $T-Nb_2O_5$. The composite particle is a particle that is composed having the phase of $T-Nb_2O_5$ having a small mass being located as the shell portion on the surface of the primary particle of the niobium-titanium composite oxide, and the (010) plane of $T-Nb_2O_5$ being in contact with the (010) plane on the surface of the primary particle of the monoclinic niobium titanium composite oxide. In this case, it is possible to uniformly and quickly take lithium ions into the composite particles or release lithium ions from the composite particles in a short time.

The crystal structures of the shell portion and the core portion included in the active material can be observed by, for example, powder X-ray diffraction measurement and transmission electron microscope (TEM) observation, or the like. Details of these measurement methods will be described later.

The active material particles may have a carbon-containing layer on a surface thereof. The carbon-containing layer may be attached to the surface of a primary particle or may be attached to the surface of a secondary particle. Alternatively, the active material particles may include secondary particles formed by agglomeration of primary particles each having a carbon-containing layer attached on the surface thereof. Such secondary particles can exhibit excellent electrical conductivity since carbon exists amongst the primary particles. The above-described mode containing the secondary particles is preferable since the active material-containing layer can exhibit a lower electric resistance.

The carbon-containing layer may cover the entire active material particles, or may cover a part of the surface of the active material particles. The active material covered with the carbon-containing layer may be referred to as an active material composite material. That is, the active material composite material includes an active material and a carbon-containing layer covering at least a part of the surface of the active material.

The active material according to the embodiment (including the active material composite material, as well) may be, for example, an active material for a battery used for a secondary battery such as a lithium ion secondary battery. Specifically, the active material can be used in an electrode of a secondary battery as an electrode active material. The electrode containing the electrode active material may, for example, operate as a negative electrode, by being used in a battery in combination with a counter electrode using a known positive electrode material. Specific examples of the positive electrode material will be described later. Alternatively, the electrode including the active material can be used in combination with a counter electrode using metallic lithium, carbon-based materials, or the like, which have electrode potentials lower than that for the active material according to the embodiment, to thereby operate the electrode including the active material as a positive electrode.

<Particle Diameter>

There is no particular limitation on an average particle diameter of the niobium-titanium composite oxide included in the first phase. Average particle diameter as referred to herein may be that for primary particles or for secondary particles. An average particle diameter of the niobium-titanium composite oxide particle is, for example, in the range of 0.1 μm to 50 μm. The average particle size may be varied in accordance with battery properties in demand. For example, in order to enhance rapid charge/discharge performance, it is preferable for the average particle diameter to be 1.0 μm or less. In such a case, a distance that lithium ions diffuse within the crystal of the niobium-titanium composite oxide can be reduced, and thus, the rapid charge/discharge performance can be enhanced. The average particle size can be obtained by laser diffraction, for example.

<BET Specific Surface Area>

There is no particular limitation to the BET (Brunauer, Emmett, Teller) specific surface area for the active material according to the embodiment. However, the BET specific surface area is preferably 5 $m^2/g$ or more and less than 200 $m^2/g$.

If the specific surface area is 5 $m^2/g$ or more, a contact area with the electrolyte can be secured, and favorable discharge rate properties can be easily obtained. In addition, the charging time can be shortened. If the specific surface area is less than 200 $m^2/g$, on the other hand, reactivity with the electrolyte does not become too high so that the life performance can be improved. Further, coating properties of a slurry including the active material, which is used in a later described production of an electrode, can be made favorable.

Here, for the measurement of the specific surface area, a method is used by which molecules, for which an occupied area in adsorption is known, are adsorbed onto the surface of powder particles at a temperature of liquid nitrogen, and the specific surface area of the sample is determined from the amount of adsorbed molecules. The most commonly used is the BET method based on low-temperature and low-humidity physical adsorption of an inert gas. The BET method is based on the BET theory, which is the most famous theory as a method of calculating the specific surface area where the Langmuir theory, which is a monomolecular layer adsorption theory, has been extended to multi-molecular layer adsorption. The specific surface area determined by the above method is referred to as a "BET specific surface area".

<Manufacturing Method>

The active material according to the embodiment can be manufactured by, for example, the synthesis method described below. A niobium-titanium composite oxide for including in a first phase is manufactured to obtain the first phase. A precursor of a second phase is attached to the surface of the first phase as a core. The precursor is converted into the second phase by heating.

The niobium-titanium composite oxide of the first phase can be synthesized, for example, as follows.

Raw materials are mixed at appropriate element ratios in accordance with the intended compositional formula of the niobium-titanium composite oxide. The obtained raw material mixture is subjected to preliminary firing at a temperature of 600° C. to 800° C. By performing the preliminary firing, it is possible to improve the reactivity between raw material powders by decomposing salts and hydroxides contained in the raw materials. After the preliminary firing, pulverization using a ball mill is preferably performed. The raw materials are more uniformly mixed by the pulverization treatment, and the intended crystal phase can be more easily obtained.

Next, the powder after preliminary firing is transferred to a platinum crucible and subjected to first main firing. In the first main firing, the firing temperature is preferably 900° C. to 1,500° C., and the firing time is preferably 1 hour to 5 hours. The intended crystalline phase can be obtained by performing the first main firing. The powder obtained after the first main firing is preferably pulverized again using a ball mill. By the pulverization treatment, the fired powder is divided into primary particles, and the crystal growth of particular surfaces is easily facilitated.

Next, the powder is subjected to second main firing to obtain the niobium-titanium composite oxide. In the second firing treatment, firing is preferably performed in the air for a long time. Specifically, the temperature increase rate is, for example, 1° C./min to 10° C./min, and preferably 2° C./min to 5° C./min. In addition, the firing temperature is, for example, 1,000° C. to 1,800° C., and preferably 1,100° C. to 1,400° C. In addition, the firing time at the firing temperature is, for example, 5 hours to 60 hours, and preferably 10 hours to 20 hours. More preferably, the powder obtained after the second firing is rapidly cooled on a platinum plate. Growth in the [001] direction can be promoted by rapid cooling treatment.

The niobium-titanium composite oxide synthesized as described above can be used for the first phase. The second phase is formed on the surface of the core including the first phase.

An acid solution containing niobium is prepared. The core (first phase) is dispersed in the solution. As the core, primary particles of the niobium-titanium composite oxide is preferably used. In addition, $TiNb_2O_7$ that is grown in the [001] direction is preferably used as the core. For example, a niobium-containing precipitate is attached to the surface of the core by adjusting a pH of the solution. The niobium-containing precipitate serves as the precursor of the second phase. The core to which the precursor is attached is recovered from the solution. The recovered core is fired at 800° C. or more and less than 1,000° C. for 15 minutes or more and 5 hours or less to convert the niobium-containing precipitate attached to the surface into an orthorhombic niobium oxide $T-Nb_2O_5$. A firing temperature at the time of conversion of the precursor is preferably 850° C. A firing time at the time of conversion of the precursor is preferably 2 hours.

The niobium-titanium composite oxide included in the core is not degenerated even when heated at 1,000° C. or more. Therefore, the niobium-titanium composite oxide can be applied to the above-described method as the core. Many other oxide-based active materials are degenerated under the firing temperature condition for converting the niobium-containing precipitate.

When the precursor attached to the surface of the core is converted into a niobium oxide, a niobium oxide as the second phase is formed in a state in which lattice matching occurs between the second (010) plane of the obtained $T-Nb_2O_5$ and the first (010) plane of the surface of the core, at the portion where the precursor is attached to the first (010) plane of the niobium-titanium composite oxide on the surface of the core. It may be expressed that $T-Nb_2O_5$ is grown from the first (010) plane of the niobium-titanium composite oxide, with the first (010) plane serving as substrate. Alternatively, it may be expressed that the second phase is obtained by growing crystals of the niobium oxide from $T-Nb_2O_5$ nuclei made of the second (010) plane fitting the first (010) plane.

More preferably, the particles of the $TiNb_2O_7$ phase in which crystallites are grown in the [001] direction are used as the core, and annealing is further performed at 400° C. to 800° C. for 12 hours or more after the precursor attached to the core is converted into $T-Nb_2O_5$. By using the $TiNb_2O_7$ particles grown in the [001] direction as the core, lattice matching between the (010) plane of the $TiNb_2O_7$ phase and the (010) plane of the $T-Nb_2O_5$ phase is likely to occur. By annealing under the above condition, the (010) plane of the $T-Nb_2O_5$ phase is preferentially grown at the contact surface between the (010) plane of the $TiNb_2O_7$ phase and $T-Nb_2O_5$ phase. More preferably, the primary particle of the $TiNb_2O_7$ phase in which the crystallite is grown in the [001] direction is used as the core.

<Method of Manufacturing Active Material Composite Material>

When the carbon-containing layer is provided on the surface of the active material, for example, the active material composite material can be manufactured by the method described below.

An active material is prepared, and the active material is dispersed in a solution containing a carbon-containing compound to prepare a dispersion. A composite including the active material and a carbon body supported on the active material is obtained from the dispersion, and the composite is fired to perform a carbonization treatment. In this way, the active material composite material can be obtained.

Details are as follows.

The active material can be prepared by the above-described method. The particles of the active material that includes the first phase including the niobium-titanium composite oxide and the second phase including the orthorhombic niobium oxide can be used.

The solvent of the solution including the carbon-containing compound is, for example, water. The pH of the dispersion may be adjusted as appropriate. The pH of the solution or dispersion can be controlled with, for example, an ammonia aqueous solution.

The carbon-containing compound is preferably an organic compound having no cyclic structure of carbon framework. Examples of such organic compounds include polyvinyl alcohol (PVA) and carboxyl methylcellulose. PVA is a particularly favorable carbon-containing compound.

The dispersion is subjected to, for example, spray drying, to thereby obtain a composite. The method for forming the phase including the carbon-containing compound on the surfaces of the active material particles is not limited to spray drying, and other methods can also be selected, such as the rolling fluidized bed granulation method (a.k.a., tumbling granulation method). The spray drying is preferred because of being able to inhibit agglomeration of particles and rapidly evaporate the dispersing solvent, thereby increasing the coating uniformity.

After performing spray drying, the powder of the obtained composite may be dried for a span of 12 hours at 100° C., for example. Next, this powder is subjected to firing under an inert gas atmosphere. This firing is carried out, for example, at a temperature within the range of 650° C. to 900° C. This firing is carried out, for example, for a span of 0.5 hours to 5 hours. The firing may be performed, for example, under a reducing atmosphere. By performing carbonization of carbon body supported on the active material in this manner, an active material composite material can be obtained.

<Method of Measuring Active Material>

Next, a method of examining the composition in the active material, a method for obtaining the X-ray diffraction profile of the active material according to the powder X-ray diffraction method, transmission electron microscope (TEM) observation, and electron beam diffraction measurement will be described.

When a target active material to be measured is included in an electrode material of a secondary battery, a pre-treatment is performed as described below.

First, in order to comprehend the crystal structure of the active material, a state close to the state in which lithium ions are completely extracted from the active material is achieved. For example, when the target active material to be measured is included in a negative electrode, the battery is brought into a completely discharged state. For example, the discharged state of the battery can be achieved by repeating several times a discharging of the battery in a 25° C. environment at 0.1 C current to a rated end voltage, or repeating several times a discharging to a battery voltage of 1.0 V, making the current value during discharge be $\frac{1}{100}$ or lower than the rated capacity. Although a slight amount of residual lithium ions may exist even in the discharged state, this does not significantly affect results of X-ray diffraction measurement described below.

Next, the battery is disassembled in a dry atmosphere, such as that in a glove box filled with argon, and the electrode is taken out. The taken-out electrode is washed with an appropriate solvent and dried under reduced pressure. For example, ethyl methyl carbonate may be used for washing. After washing and drying, whether or not there are white precipitates such as a lithium salt on the surface is examined, to determine whether washing was sufficient. If the washing of the electrode is insufficient, an impurity phase such as that of lithium carbonate and lithium fluoride may be mixed in due to the influence of the lithium ions remaining in the electrode. In such a case, it is preferable to use an airtight container with which the measurement atmosphere can be made an inert gas atmosphere.

The washed electrode is processed or treated into a measurement sample as appropriate, depending on the measurement method to be subjected to. For example, in the case of subjecting to the powder X-ray diffraction measurement, the washed electrode is cut into a size having the same area as that of a holder of the powder X-ray diffraction apparatus, and used as a measurement sample.

<Examination of Composition in the Active Material>

The composition of the composite oxide in the active material can be analyzed using Inductively Coupled Plasma (ICP) emission spectrometry, for example.

In order to measure the composition of the active material assembled into a battery according to ICP emission spectrometry, the following procedure is specifically performed.

First, according to the previously described procedure, an electrode including the target active material to be measured is taken out from a secondary battery, and washed. From the washed electrode, the portion including the active material, such as the active material-containing layer, is removed. For example, the portion including the active material can be removed by irradiating with an ultrasonic wave. As a specific example, an electrode is put into ethyl methyl carbonate in a glass beaker, the glass beaker is vibrated in an ultrasonic washing machine, and thereby an active material-containing layer including the electrode active material can be separated from a current collector, for example.

Next, the separated portion is heated for a short time (e.g., about 1 hour at 500° C.) in air to thereby sinter away unnecessary components such as binder components and carbon. By dissolving the residue in an acid, a liquid sample including the active material can be prepared. Here, hydrochloric acid, nitric acid, sulfuric acid, hydrogen fluoride, and the like may be used as the acid. The components in the active material can be found by subjecting the liquid sample to ICP analysis.

<Powder X-Ray Diffraction Measurement of Active Material>

The powder X-ray diffraction measurement of the active material can be performed, for example, as follows.

First, the target sample is ground until an average particle size reaches about 5 μm. The ground sample is filled into a holder portion having a depth of 0.2 mm that is formed on a glass sample plate. At this time, care should be taken to fill the holder portion sufficiently with the sample. In addition, precaution should be taken to perform the filling with the amount of the sample neither being excessive nor insufficient such that there would not be any cracks, voids, or the like. Next, another glass plate is pressed from the outside to flatten a surface of the sample filling the holder portion. Precaution should be taken such that there would not be any recess or a protrusion with respect to a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Note that, there may be a case where the orientation of the sample becomes great depending on a particle shape of the sample. In the case where there is high degree of orientation in the sample, there is the possibility of deviation of the peak or variation in an intensity ratio, depending on how the sample is filled. Such a sample having significantly high orientation is measured using a glass capillary. Specifically, the sample is inserted into the capillary, which is then mounted on a rotary sample table and measured while being rotated. Such a measuring method can provide the result with the influence of orientation reduced. It is preferable to use a capillary formed of Lindeman glass having a diameter of 1 mm to 6 mm φ as the glass capillary.

When the target active material to be measured is included in the electrode material of a secondary battery, first, measurement sample is prepared according to the previously described procedure. The obtained measurement sample is affixed directly to the glass holder, and measured.

In an electrode, the active material may be included in an active material-containing layer. The active material containing-layer may also include an electro-conductive agent and a binder, aside from the active material. In addition, the electrode may include a current collector, for example, made of a metal foil, aside from the active material-containing layer. Therefore during measurement, peaks derived from the metal foil serving as the current collector, the electro-conductive agent, the binder, and the like are measured and grasped in advance using XRD. It is a matter of course that this operation can be omitted if such peaks has been grasped in advance.

When the peak(s) of the current collector and the peak(s) of the active material overlap with each other, it is desirable to perform the measurement after removing the active material-containing layer off from the current collector. This is in order to separate the overlapping peaks when quantitatively measuring the peak intensity. Although the active material-containing layer may be physically dislodged, removing is easily performed when ultrasonic waves are applied in a solvent. When ultrasonic treatment is performed to remove the active material-containing layer off from the current collector, an electrode powder (including the active material, the electro-conductive agent, and the binder) can be collected by evaporating the solvent. The powder X-ray diffraction measurement of the active material can be performed by filling for example, a Lindemann glass capillary or the like with the collected electrode powder and performing the measurement. The electrode powder collected by the ultrasonic treatment can also be subjected to various analysis other than the powder X-ray diffraction measurement.

In the obtained diffraction peak, the T-Nb$_2$O$_5$ phase and the niobium-titanium composite oxide phase can be separated. It is also possible to quantitatively investigate the mixed state of each crystal phase by using Rietveld analysis. That is, the mass ratio of the T-Nb$_2$O$_5$ phase and the niobium-titanium composite oxide phase can be determined.

In addition, as described below, it can be confirmed whether the niobium-titanium composite oxide grown in the direction is included.

The size of the crystallite related to the (001) plane of the niobium-titanium composite oxide can be calculated from the X-ray diffraction pattern. That is, the crystallite diameter related to the (001) plane can be calculated by using the full width at half maximum of the peak corresponding to the (001) plane (integrated width of the diffraction peak) and the Scherrer equation shown below. When the crystallite size is higher than the average value of the crystallite diameters obtained from other plane indexes, it can be determined that the niobium-titanium composite oxide is grown in the [001] direction.

The Scherrer equation is shown below:

$$D = K\lambda/\beta \cos\theta$$

Herein, D is the crystallite diameter, λ is the X-ray wavelength, θ is the Bragg angle, β is the integration width of the diffraction peak, and K is the Scherrer constant.

Note that the Scherrer constant used in the calculation is 4/3.

As an apparatus for powder X-ray diffraction measurement, SmartLab manufactured by Rigaku is used, for example. Measurement is performed under the following condition:

X-ray source: Cu target
Output: 45 kV, 200 mA
roller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: 5°≤2θ≤90°

When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement is desirably set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

(TEM Observation and Electron Beam Diffraction Measurement of Electrode Material)

According to the transmission electron microscope (TEM) observation, it is possible to examine the distribution of each crystal in a material having a mixed phase. In addition, the presence or absence of the carbon-containing layer can be examined by TEM observation.

An electrode taken out from the battery as described above can be used as the measurement sample as is. Alternatively, the electrode powder recovered in a manner similar to the method described in the powder X-ray diffraction measurement method can be used for the measurement as described below.

In the TEM observation, a target sample powder is desirably embedded in a resin or the like and then subjecting to shaving by mechanical polishing, ion milling, or the like to expose the specimen interior. Similar processing can be performed even if the target sample is an electrode. For example, a desired portion can be observed by embedding an electrode sample directly into a resin, as is. Alternatively, the current collector (metal foil) may be removed from the electrode, to observe the sample as an electrode powder where the conductive material and the binder are mixed. In this manner, it is possible to know how the two crystal phases and crystal planes are distributed within the active material particle. On top of that, a composition within the particle can be known. That is, whether or not the (010) plane of the T-Nb$_2$O$_5$ phase is present can be examined. In addition, it can be examined whether or not the (010) plane of the T-Nb$_2$O$_5$ phase and the (010) plane of the niobium-titanium composite oxide phase are in contact.

Figure 4:
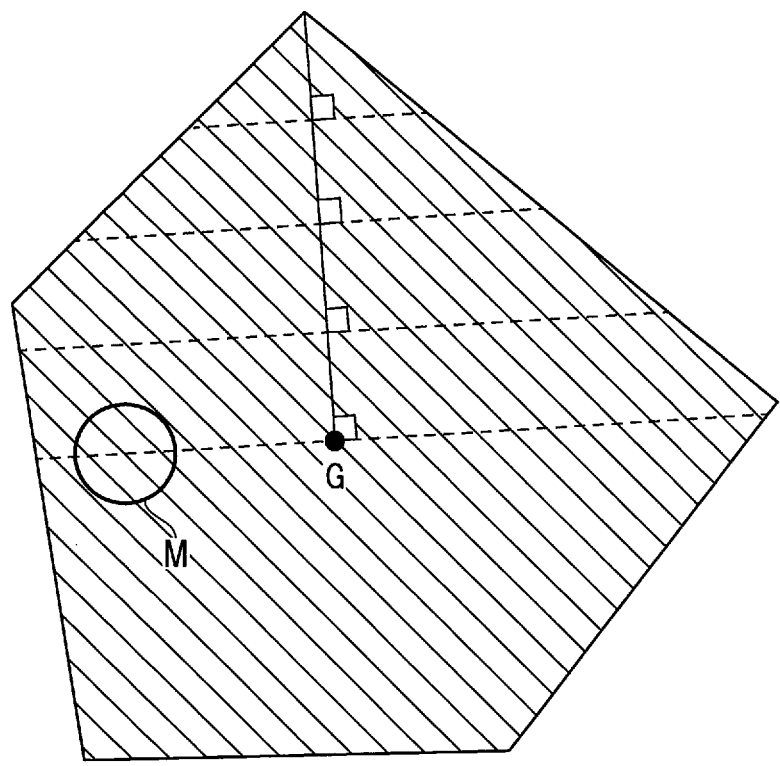
FIG. 4 is a cross-sectional view schematically illustrating a particle measured in a transmission electron microscope (TEM) observation.
Figure 5:
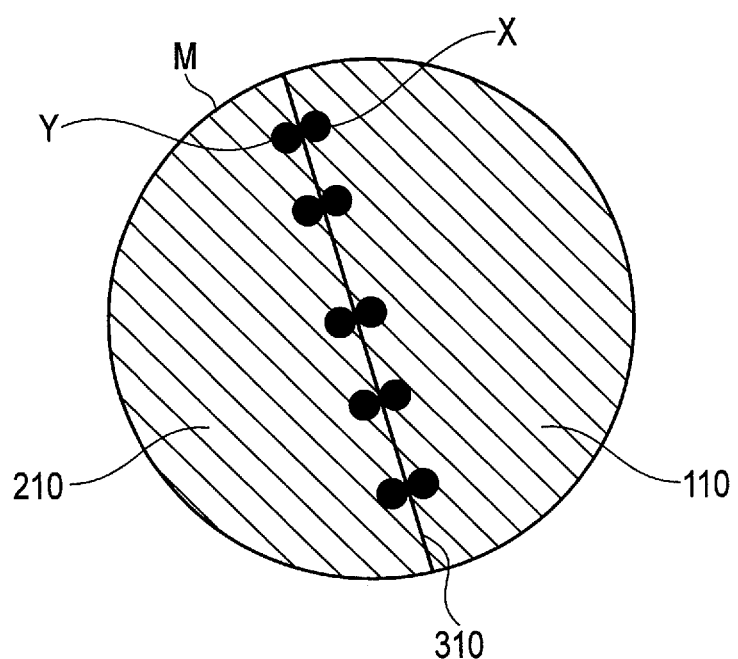
FIG. 5 is an enlarged cross-sectional view of a section M of the particle illustrated in FIG. 4.

A specific example will be described hereinafter with reference to FIGS. 4 and 5. FIG. 4 is a plan view schematically illustrating a particle being measured. FIG. 5 is an enlarged cross-sectional view of section M of the particle illustrated in FIG. 4.

First, a point G that is the center of gravity of the particle to be measured is regarded as the center of the particle. Next, five measurement points are set at equal intervals on a straight line connecting the center of the particle and an arbitrary point on the particle surface. In the region orthogonal to each measurement point, observation of electron diffraction pattern is performed from the center of gravity toward the shell. At this time, the interface (contact interface) where the orthorhombic T-Nb$_2$O$_5$ phase appears from the niobium-titanium composite oxide phase can be found by investigating the multi-wave interference image. For example, the T-Nb$_2$O$_5$ phase, the niobium-titanium composite oxide phase, and other phases can be easily distinguished by simulating the electron beam diffraction pattern in advance. In addition, since the electron beam diffraction pattern is different according to the crystal plane, it is also possible to distinguish the crystal plane.

The contact probability between the first (010) plane and the second (010) plane at the contact interface between the niobium-titanium composite oxide phase and the T-Nb$_2$O$_5$ phase, that is, the proportion of the first (010) plane in contact with the second (010) plane amongst the first (010) plane located at the contact interface can be investigated, for example, as follows. The approximate position of the interface between the niobium-titanium composite oxide phase and the T-Nb$_2$O$_5$ phase (the contact interface between the first phase and the second phase) is grasped by the above-described method. For example, in the field of view including the interface 310 between the niobium-titanium composite oxide phase 110 and the niobium oxide phase 210 as illustrated in FIG. 5, a measurement point X exhibiting the electron diffraction pattern of the (010) plane of the niobium-titanium composite oxide phase 110 is found along the interface 310. Next, the electron beam diffraction pattern at a measurement point Y, which is the contact surface of the niobium oxide phase 210 adjacent to the measurement point X with the interface 310 interposed therebetween, is investigated. It is investigated whether or not the electron beam diffraction pattern at the measurement point Y corresponds to the (010) plane of the niobium oxide phase 210. When the particle being measured is a particle in which the second (010) plane of the T-Nb$_2$O$_5$ phase and the first (010) plane of the niobium-titanium composite oxide phase are in contact with each other, for example, the (010) plane of the niobium oxide phase 210 may be confirmed at 25% or more positions among the measurement points Y with respect to 100 arbitrary measurement points X.

When examining the presence or absence of the carbon-containing layer, it is not preferable that the measurement sample is embedded in the resin as is. This is because it is sometimes difficult to distinguish the resin from the carbon-containing layer at the surface. Therefore, the measurement sample is preferably first coated with a heavy element in advance. The heavy element appears as dark contrast in the TEM image, and thus, the carbon-containing layer and the resin can be distinguished. For example, Ru element is used as the heavy element. Next, the electrode is encased in an epoxy-based resin. Thereafter, the immobilized sample is mechanically polished, and then made into a thin film by ion milling. For example, DualMill 600 available from GATAN is used as an apparatus for the ion milling.

For example, H-9000UHR III available from Hitachi, Ltd. is used as an analyzer for the TEM observation. The observation conditions are, for example, acceleration voltage: 300 kV, and image magnification: 400000-fold magnification.

According to the first embodiment, there is provided an active material including a first phase and a second phase adjacent to the first phase. The first phase includes a niobium-titanium composite oxide. The second phase includes an orthorhombic niobium oxide. The active material is a particle made with a second (010) plane of the orthorhombic niobium oxide coming in contact with a first (010) plane of the niobium-titanium composite oxide in at least a part of a contact interface between the first phase and the second phase. The active material can realize a secondary battery capable of exhibiting excellent energy density and excellent pulse input-output performance.

Second Embodiment

According to the second embodiment, an electrode is provided.

The electrode according to the second embodiment contains the active material according to the first embodiment. This electrode may be a battery electrode containing the active material according to the first embodiment as an active material for a battery. The electrode as a battery electrode may be, for example, a negative electrode containing the active material according to the first embodiment as a negative electrode active material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more kinds of the active material according to the first embodiment. Furthermore, a mixture where one kind or two or more kinds of the active material according to the first embodiment is further mixed with one kind or two or more kinds of another active material may also be included.

For example, in a case where the active material according to the first embodiment is included as the negative electrode active material, examples of other active materials include lithium titanate having a ramsdellite structure (e.g., Li$_{2+y}$Ti$_3$O$_7$, 0≤y≤3), lithium titanate having a spinel structure (e.g., Li$_{4+x}$Ti$_5$O$_{12}$, 0≤x≤3), monoclinic titanium dioxide (TiO$_2$), anatase titanium dioxide, rutile titanium dioxide, a hollandite titanium composite oxide, and an orthorhombic titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxyl methylcellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. $Li/Li^+$) at which lithium (Li) is inserted into and extracted from active material. For example in the case where the active material is used as a negative electrode active material, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

The electrode according to the second embodiment contains the active material according to the first embodiment. Thus, the electrode can realize a secondary battery that is able to exhibit excellent energy density and excellent pulse input-output performance.

Third Embodiment

According to a third embodiment, there is provided a secondary battery including a negative electrode, a positive electrode, and an electrolyte. As the negative electrode, the secondary battery includes the electrode according to the second embodiment. That is, the secondary battery according to the third embodiment includes as the negative electrode, an electrode that includes the active material according to the first embodiment as a battery active material.

The secondary battery according to the third embodiment may further include a separator provided between the positive electrode and the negative electrode. The negative electrode, the positive electrode, and the separator can structure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, sections overlapping with the details described in the second embodiment are omitted.

The density of the negative electrode active material-containing layer (excluding the current collector) is preferably from 1.8 g/cm³ to 3.5 g/cm³. The negative electrode, in which the density of the negative electrode active material-containing layer is within this range, is excellent in energy density and ability to hold the electrolyte. The density of the negative electrode active material-containing layer is more preferably from 2.5 g/cm³ to 2.9 g/cm³.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle diameter of the positive electrode active material is preferably from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxyl methylcellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, using a positive electrode active material, for example.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative electrode Terminal

The negative electrode terminal may be made of a material that is electrochemically stable at the potential (V vs. Li/Li$^+$) at which Li is inserted into and extracted from the above-described negative electrode active material, and has electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance between the negative electrode terminal and the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the third embodiment will be more specifically described with reference to the drawings.

Figure 6:
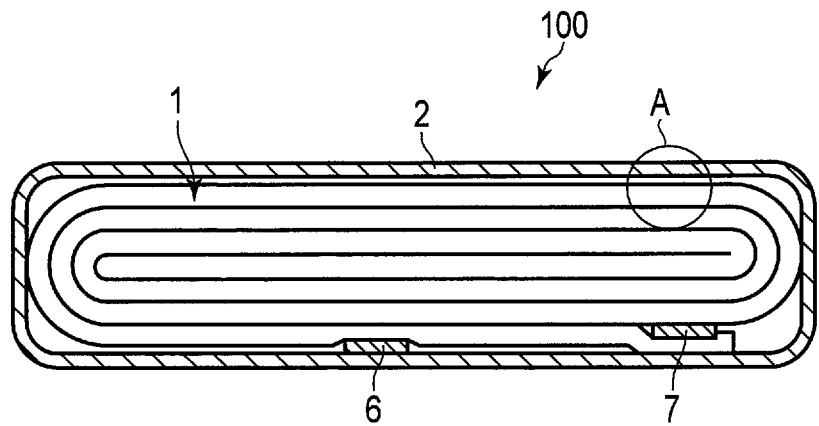
FIG. 6 is a cross-sectional view schematically illustrating an example of a secondary battery according to an embodiment.
Figure 7:
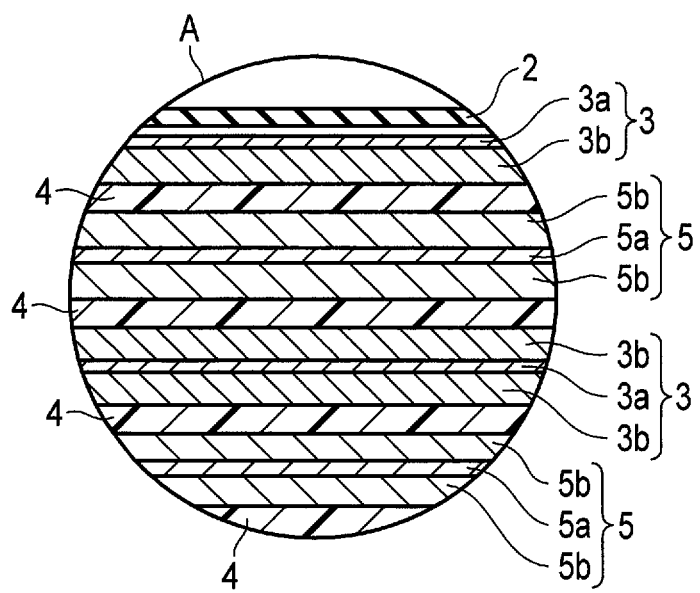
FIG. 7 is an enlarged cross-sectional view of section A of the secondary battery shown in FIG. 6.

FIG. 6 is a cross-sectional view schematically showing an example of a secondary battery according to the third embodiment. FIG. 7 is an enlarged cross-sectional view of section A of the secondary battery shown in FIG. 6.

The secondary battery 100 shown in FIGS. 6 and 7 includes a bag-shaped container member 2 shown in FIGS. 6 and 7, an electrode group 1 shown in FIG. 6, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 6, the electrode group 1 is a wound electrode group in a flat form. The wound electrode group 1 in a flat form includes a negative electrode 3, a separator 4, and a positive electrode 5, as shown in FIG. 7. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 7. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 6, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 8:
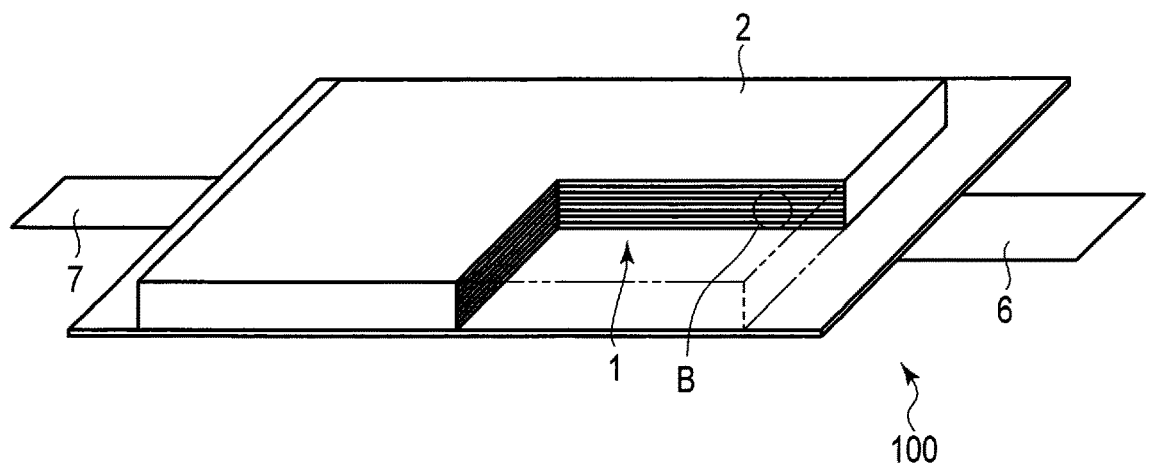
FIG. 8 is a partially cut-out perspective view schematically showing another example of the secondary battery according to the embodiment.
Figure 9:
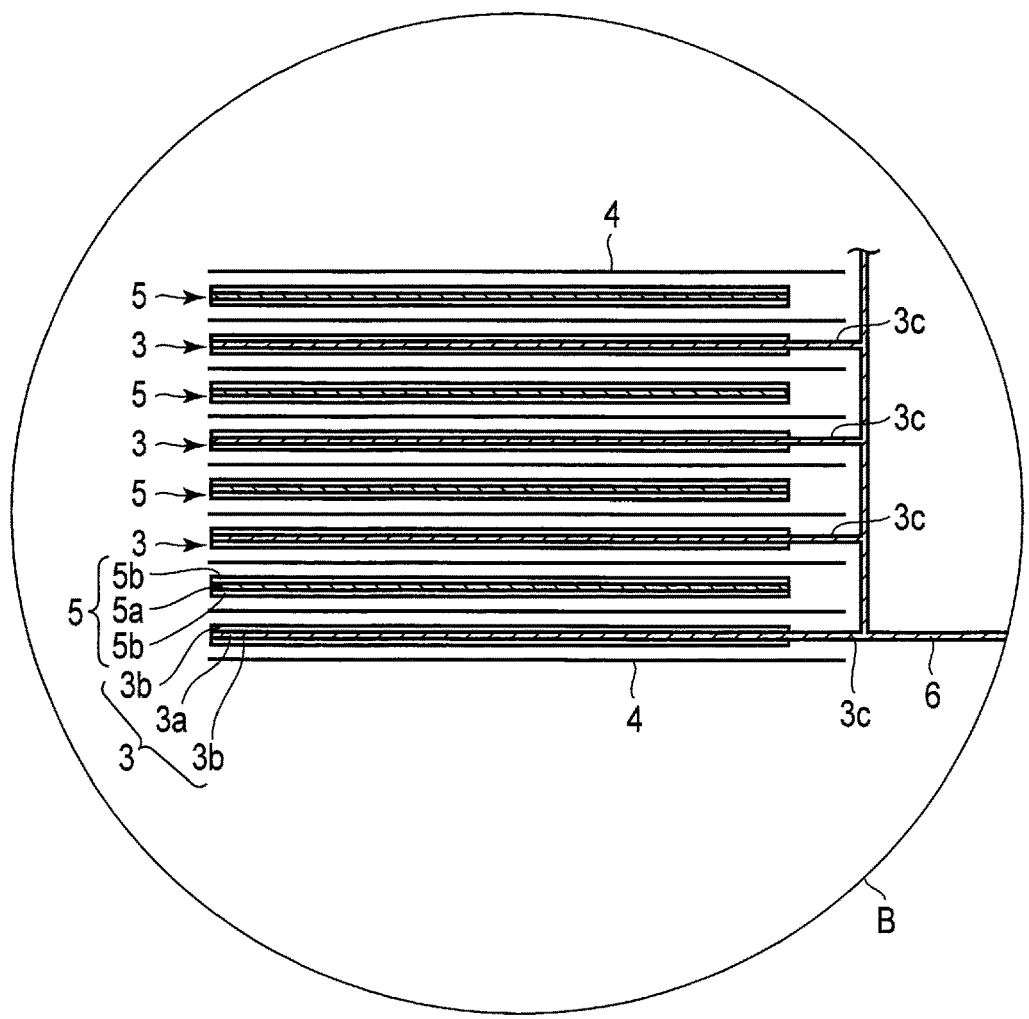
FIG. 9 is an enlarged cross-sectional view of section B of the secondary battery shown in FIG. 8.

The secondary battery according to the third embodiment is not limited to the secondary battery of the structure shown in FIGS. 6 and 7, and may be, for example, a battery of a structure as shown in FIGS. 8 and 9.

FIG. 8 is a partially cut-out perspective view schematically showing another example of a secondary battery according to the third embodiment. FIG. 9 is an enlarged cross-sectional view of section B of the secondary battery shown in FIG. 8.

The secondary battery 100 shown in FIGS. 8 and 9 includes an electrode group 1 shown in FIGS. 8 and 9, a container member 2 shown in FIG. 8, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 9, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 9, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector Sa of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment contains the active material according to the first embodiment as a negative electrode active material. Thus, the secondary battery has excellent energy density and excellent pulse input-output performance.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

Figure 10:
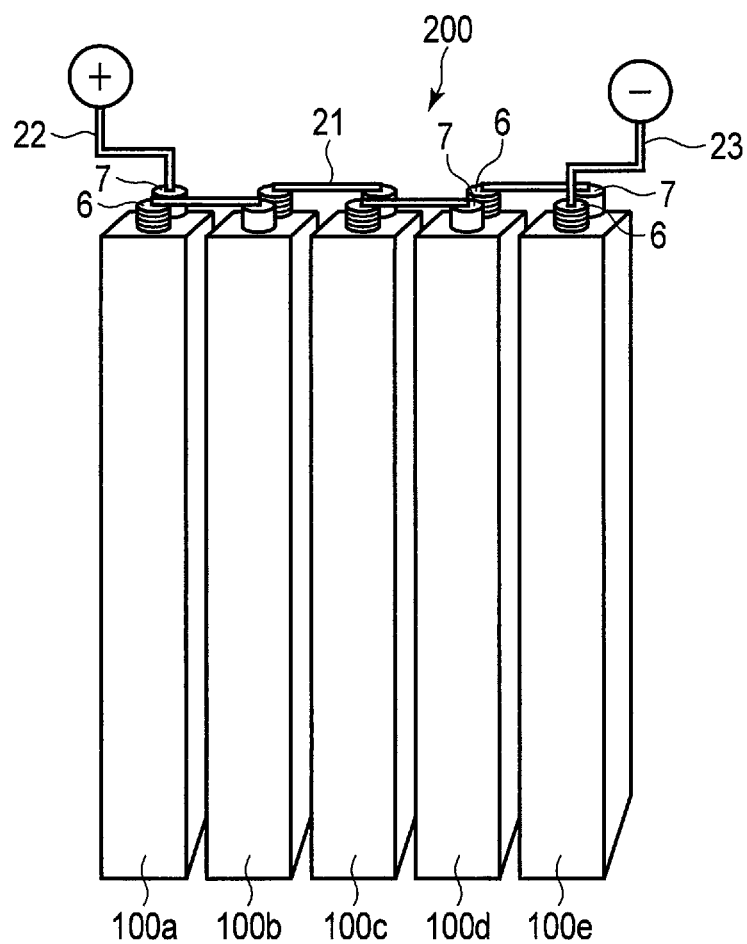
FIG. 10 is a perspective view schematically showing an example of a battery module according to an embodiment.

FIG. 10 is a perspective view schematically showing an example of the battery module according to the fourth embodiment. A battery module 200 shown in FIG. 10 includes five single-batteries 100a to 100e, four bus bars 21, a positive electrode-side lead 22, and a negative electrode-side lead 23. Each of the five single-batteries 100a to 100e is a secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 10 is a battery module of five in-series connection.

As shown in FIG. 10, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the fourth embodiment includes the secondary battery according to the third embodiment. Thus, the battery module has excellent energy density and excellent pulse input-output performance.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 11:
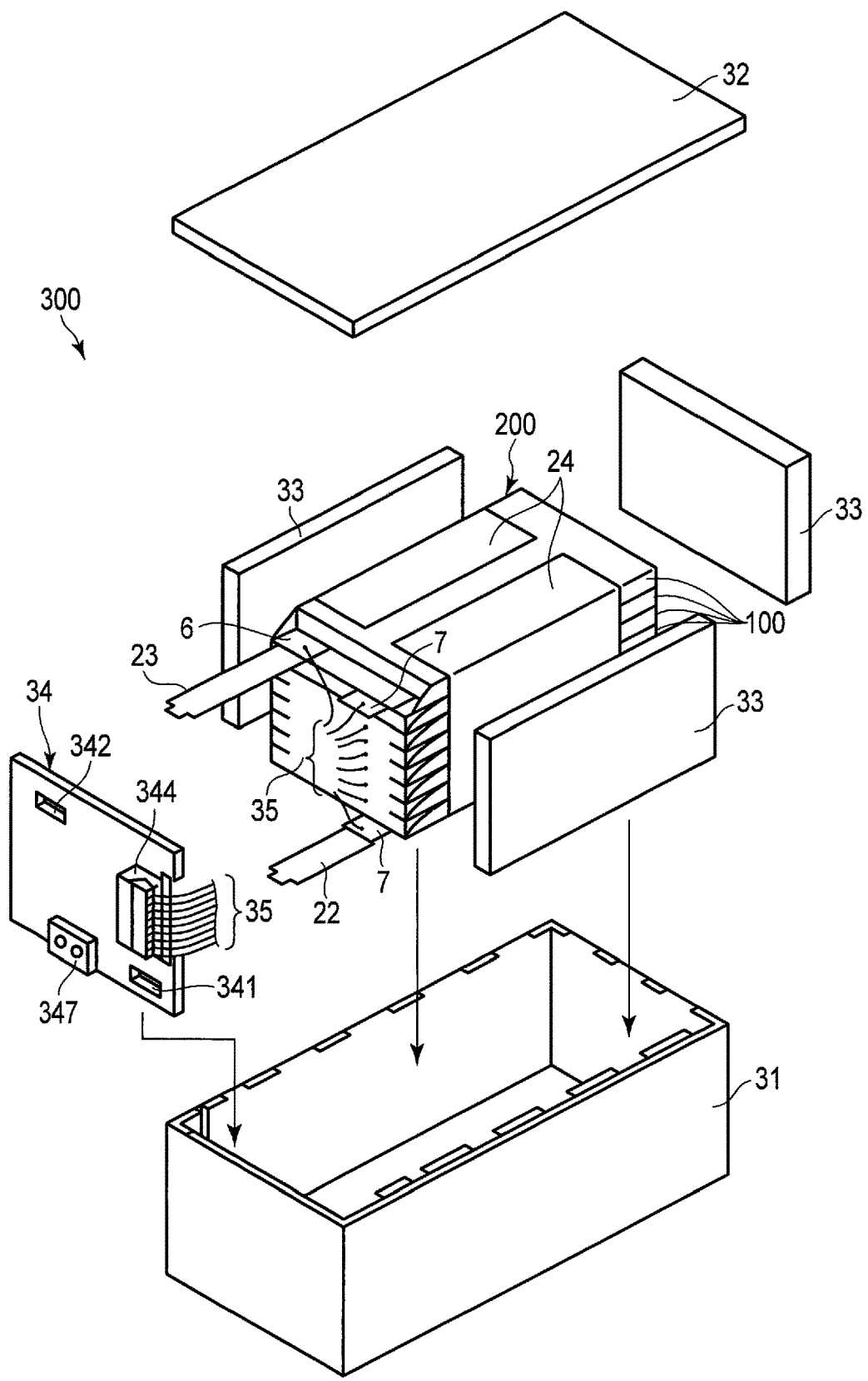
FIG. 11 is an exploded perspective view schematically showing an example of a battery pack according to an embodiment.

FIG. 11 is an exploded perspective view schematically showing an example of the battery pack according to the fifth embodiment. FIG. 12 is a block diagram showing an example of an electric circuit of the battery pack shown in FIG. 11.

A battery pack 300 shown in FIGS. 11 and 12 includes a housing container 31, a lid 32, protective sheets 33, a battery module 200, a printed wiring board 34, wires 35, and an insulating plate (not shown).

The housing container 31 shown in FIG. 11 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

A single-battery 100 has a structure shown in FIGS. 6 and 7. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 12. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fifth embodiment is provided with the secondary battery according to the third embodiment or the battery module according to the fourth embodiment. Accordingly, the battery pack has excellent energy density and excellent pulse input-output performance.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, the battery packs may be electrically connected in series, electrically connected in parallel, or electrically connected in a combination of in-series connection and in-parallel connection.

An example of the vehicle according to the sixth embodiment is explained below, with reference to the drawings.

FIG. 13 is a cross-sectional view schematically showing an example of a vehicle according to the sixth embodiment.

A vehicle 400, shown in FIG. 13 includes a vehicle body 40 and a battery pack 300 according to the fifth embodiment. In the example shown in FIG. 13, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 13, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 14, an aspect of operation of the vehicle according to the sixth embodiment is explained.

FIG. 14 is a view schematically showing another example of the vehicle according to the sixth embodiment. A vehicle 400, shown in FIG. 14, is an electric automobile.

The vehicle 400, shown in FIG. 14, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 14, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 14) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism (i.e., a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not illustrated) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Thus, a high performance vehicle can be provided, according to the embodiment.

EXAMPLES

Hereinafter, the above embodiment will be described in more detail based on examples.

Example 1

(Preparation of Active Material Particles)

First, titanium dioxide and niobium pentoxide were mixed at a molar ratio of 1:1 to prepare a raw material mixed powder. Next, after subjecting the mixture to preliminary firing at 650° C. for 12 hours, the preliminary fired product was transferred to a platinum crucible, and subjected to first main firing. Upon performing the first main firing, the powder obtained after preliminary firing was calcined at 1,150° C. for 2 hours, and then pulverized again for 1 hour using a ball mill. The powder was subjected to second main firing to obtain a niobium-titanium composite oxide. Upon performing the second main firing, the temperature increase rate was set to 10° C./min, the firing temperature was set to 1,200° C., and firing was performed for 10 hours. The obtained niobium-titanium composite oxide was sufficiently washed with pure water, and then pulverized for 3 hours using a ball mill. Thereby, obtained were primary particles of niobium-titanium composite oxide, as the core portion of the active material.

Separately, 3.5 g of niobium oxalate $Nb(HC_2O_4)_5$ was dissolved in a nitric acid solution containing aqueous hydrogen peroxide to prepare a niobium-containing acid solution. 100 g of the above monoclinic niobium-titanium composite oxide as the core was added to the acid solution and stirred and mixed for 1 hour. After that, as a precipitating agent, a 50% aqueous solution of ammonia was added such that a molar amount would be 10 times that of nitric acid, to thereby adjust a pH to 12. Subsequently, the pH-adjusted solution was stirred at room temperature for 4 hours to obtain a precipitate. The obtained precipitate was recovered by centrifugation at 1,000 rpm for 10 minutes and sufficiently washed with pure water. The recovered precipitate was vacuum-dried at 90° C. for 12 hours and then fired at 850° C. for 2 hours to form an orthorhombic $T-Nb_2O_5$ phase on the surface of the core particle, to thereby obtain an active material particle of Example 1.

(Preparation of Active Material Composite Material)

Next, the active material particles obtained by the above described method were made to support a carbon body and subjected to carbonization treatment, thereby obtaining an active material composite material. More specifically, first, polyvinyl alcohol (PVA) and pure water were mixed to prepare an aqueous PVA solution. The concentration of PVA in the aqueous PVA solution was 15% by mass. Then, the active material particles, which were obtained as described above, were added to the aqueous PVA solution, and the solution was stirred to prepare a dispersion. Next, the dispersion was subjected to spray drying to obtain a powder sample. Next, the powder sample was further dried at a temperature of 100° C. for 12 hours, thereby obtaining active material particles supporting an unfired carbon body. Next, carbonization treatment was performed by firing the active material particles under a reducing atmosphere at a temperature of 700° C. for 1 hour, thereby obtaining powder of the active material composite material.

(Production of Negative Electrode)

A negative electrode was produced in the following manner.

First, 100 parts by mass of active material, 6 parts by mass of electro-conductive agent, and 4 parts by mass of binder were dispersed in a solvent to prepare a slurry. As the active material, the active material composite material obtained by the above described method were used. As the electro-conductive agent, a mixture of acetylene black and graphite was used. In the mixture, the mass ratio of acetylene black and graphite was 1:2. As the binder, a mixture of carboxyl methylcellulose (CMC) and styrene butadiene rubber (SBR) was used. In the mixture, the mass ratio of CMC and SBR was 1:1. As the solvent, pure water was used.

Next, the obtained slurry was applied onto both the surfaces of a current collector, and the coating was dried, thereby forming an active material-containing layer. As the current collector, an aluminum foil having a thickness of 12 µm was used. After drying under vacuum at 130° C. for 12 hours, the current collector and the active material-containing layer were pressed using a roll-pressing apparatus to obtain a negative electrode. The density of the active material-containing layer after pressing was 2.5 g/cm³. The pressing pressure was kept common amongst the examples and comparative examples.

(Production of Positive Electrode)

Subsequently, a positive electrode was produced in the following manner.

With respect to a commercially-available spinel lithium nickel cobalt manganese composite oxide $(LiNi_{0.5}Co_{0.2}Mn_{0.3}O_2)$, acetylene black as electro-conductive agent was mixed at a proportion of 5 parts by mass to obtain a mixture. Next, this mixture was dispersed in N-methylpyrrolidone (NMP) to obtain a dispersion. To this dispersion, PVdF as binder was mixed at a proportion of 5 parts by mass with respect to the lithium nickel cobalt manganese composite oxide to prepare a positive electrode slurry. This slurry was applied onto a current collector in the same manner as for the negative electrode. The current collector onto which the slurry was applied was dried under vacuum at 130° C. for 12 hours, and then pressed such that the density of the active material-containing layer (excluding the current collector) was 2.1 g/cm³, thereby obtaining a positive electrode.

(Production of Electrode Group)

The positive electrode and the negative electrode produced as described above were stacked with a polyethylene separator interposed therebetween to obtain a stack. Next, the stack was wound and further pressed, to thereby obtain a wound electrode group having a flat shape. A positive electrode terminal and a negative electrode terminal were connected to this electrode group.

(Preparation of Nonaqueous Electrolyte)

A mixed solvent of ethylene carbonate and diethyl carbonate (volume ratio 1:1) was prepared as a mixed solvent. Lithium hexafluorophosphate ($LiPF_6$) was dissolved in this solvent at a concentration of 1 M. Thus, a nonaqueous electrolyte was prepared.

(Assembly of Nonaqueous Electrolyte Battery)

The electrode group and the nonaqueous electrolyte manufactured as described above were housed in the container member made of a laminate film to prepare a battery having a design capacity of 1,000 mAh. The obtained battery was used as the nonaqueous electrolyte battery of Example 1.

Example 2

Active material particles were obtained in the same manner as described in Example 1, except that the amount of niobium oxalate $Nb(HC_2O_4)_5$ dissolved in the nitric acid solution containing aqueous hydrogen peroxide was changed from 3.5 g to 7.0 g.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 3

Active material particles were obtained in the same manner as described in Example 1, except that the amount of niobium oxalate $Nb(HC_2O_4)_5$ dissolved in the nitric acid solution containing aqueous hydrogen peroxide was changed from 3.5 g to 14.0 g.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 4

Active material particles were obtained in the same manner as described in Example 1, except that the amount of niobium oxalate $Nb(HC_2O_4)_5$ dissolved in the nitric acid solution containing aqueous hydrogen peroxide was changed from 3.5 g to 21.0 g.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 5

Active material particles were obtained in the same manner as described in Example 1, except that after the second main firing was performed at 1,200° C. for 10 hours, the obtained powder was taken out from the electric furnace and rapidly cooled on a platinum plate to accelerate the growth of the niobium-titanium composite oxide as the core in the [001] direction.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 6

In synthesizing the niobium-titanium composite oxide, tantalum pentoxide ($Ta_2O_5$), vanadium pentoxide ($V_2O_5$), and bismuth (III) oxide ($Bi_2O_3$) were further added to the raw material mixed powder. The molar ratio of each raw material in the raw material mixed powder was titanium dioxide:niobium pentoxide:tantalum pentoxide:vanadium pentoxide:bismuth (III) oxide=1.00:0.985:0.005:0.005:0.005. The firing temperature in the first main firing was changed from 1,150° C. to 1,000° C. In the second main firing, the firing temperature was changed from 1,200° C. to 1,150° C., and the firing time was changed from 10 hours to 4 hours. Active material particles were obtained in the same manner as described in Example 1, except that the raw materials and synthesis conditions were changed as described above for the niobium-titanium composite oxide as the core.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 7

In synthesizing the niobium-titanium composite oxide, phosphorus pentoxide ($P_2O_5$), potassium carbonate ($K_2CO_3$), and silicon oxide ($SiO_2$) were further added to the raw material mixed powder. The molar ratio of each raw material in the raw material mixed powder was titanium dioxide:niobium pentoxide:potassium carbonate:silicon oxide:phosphorus pentoxide=0.95:0.995:0.005:0.01:0.02. Active material particles were obtained in the same manner as described in Example 1, except that the raw material of the niobium-titanium composite oxide as the core was changed, as such.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 8

In synthesizing the niobium-titanium composite oxide, molybdenum trioxide ($MoO_3$), sodium carbonate ($Na_2CO_3$), magnesium oxide (MgO), and tungsten trioxide ($WO_3$) were further added to the raw material mixed powder. The molar ratio of each raw material in the raw material mixed powder was titanium dioxide:niobium pentoxide:molybdenum trioxide:sodium carbonate:magnesium oxide:tungsten trioxide=0.93:0.99:0.02:0.005:0.01:0.03. Active material particles were obtained in the same manner as described in Example 1, except that the raw material of the niobium-titanium composite oxide as the core was changed, as such.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 9

In synthesizing the niobium-titanium composite oxide, molybdenum trioxide ($MoO_3$), chromium trioxide ($Cr_2O_3$), iron (III) oxide ($Fe_2O_3$), aluminum oxide ($Al_2O_3$), and boron oxide ($B_2O_3$) were further added to the raw material mixed powder. The molar ratio of each raw material in the raw material mixed powder was titanium dioxide:niobium pentoxide:molybdenum trioxide:chromium trioxide:iron (III) oxide:aluminum oxide:boron oxide=0.7:0.85:0.15:0.025:0.025:0.05:0.05. Active material particles were obtained in the same manner as described in Example 1, except that the raw material of the niobium-titanium composite oxide as the core was changed, as such.

An active material composite material was obtained in the same manner as described in Example 1, except that the active material particles were used. A negative electrode was prepared in the same manner as described in Example 1, except that the active material composite material was used as the active material. Further, a nonaqueous electrolyte battery was prepared in the same manner as described in Example 1, except that the negative electrode was used.

Example 10

Active material particles were obtained in the same manner as described in Example 1, except that the procedure of preparing the active material composite material, that is, the attachment of the carbon body to the surface of the active material particle and the carbonization treatment were omitted. A negative electrode was prepared in the same manner as described in Example 1, except that active material particles not having the carbon-containing layer were used as the active material. Further, a nonaqueous electrolyte battery was prepared in the same manner as described in Example 1, except that the negative electrode was used.

Comparative Example 1

An active material composite material was obtained in the same manner as described in Example 1, except that the primary particles of the niobium-titanium composite oxide as the core in Example 1 were used as the active material particles as they were. That is, in Comparative Example 1, an active material composite material was obtained by providing a carbon-containing layer on primary particles that had been obtained by merely pulverizing the synthesized niobium-titanium composite oxide for 3 hours using a bead mill after washing sufficiently with pure water.

A negative electrode was prepared in the same manner as described in Example 1, except that the active material composite material was used as the active material. Further, a nonaqueous electrolyte battery was prepared in the same manner as described in Example 1, except that the negative electrode was used.

Comparative Example 2

100 g of niobium oxalate $Nb(HC_2O_4)_5$ was dissolved in a nitric acid solution containing aqueous hydrogen peroxide. As a precipitating agent, 50% aqueous solution of ammonia was added such that a molar amount would be 10 times that of nitric acid, to adjust a pH to 12. Subsequently, the pH-adjusted solution was stirred at room temperature for 4 hours to obtain a precipitate. The obtained precipitate was recovered by centrifugation at 1,000 rpm for 10 minutes and sufficiently washed with pure water. The recovered precipitate was vacuum-dried at 90° C. for 12 hours and then fired at 850° C. for 2 hours to form a singular $T-Nb_2O_5$ phase. In Comparative Example 2, an active material composite material was obtained in the same manner as described in Example 1 by using the singular $T-Nb_2O_5$ thus obtained as the active material particles.

A negative electrode was prepared in the same manner as described in Example 1, except that the active material composite material was used as the active material. Further, a nonaqueous electrolyte battery was prepared in the same manner as described in Example 1, except that the negative electrode was used.

Comparative Example 3

The niobium-titanium composite oxide of Comparative Example 1 and the $T-Nb_2O_5$ of Comparative. Example 2 were mixed in a ball mill for 1 hour to obtain a mixed powder. The ratio of $T-Nb_2O_5$ to the niobium-titanium composite oxide in the mixed powder was set to 10% by mass. In Comparative Example 3, an active material composite material was obtained in the same manner as described in Example 1, except that the mixed powder was used instead of the active material particles.

A negative electrode was prepared in the same manner as described in Example 1, except that the active material composite material was used as the active material. Further, a nonaqueous electrolyte battery was prepared in the same manner as described in Example 1, except that the negative electrode was used.

Comparative Example 4

$T-Nb_2O_5$ of Comparative Example 2 was dispersed in an aqueous solution of polyvinyl alcohol having a concentration of 5% by mass to obtain a dispersion. The dispersion was attached to the surface of the niobium-titanium composite oxide of Comparative Example 1 by using a rolling fluidized bed format coating apparatus to obtain a granulated powder. The amount of the dispersion was adjusted so that the ratio of $T-Nb_2O_5$ to the niobium-titanium composite oxide was 10% by mass. Next, the powder was further dried at a temperature of 100° C. for 12 hours. Subsequently, the dried powder was heated in a reducing atmosphere at a temperature of 700° C. for 1 hour to obtain a powder of the active material composite material. In Comparative Example 4, an active material composite material was obtained as described above.

A negative electrode was prepared in the same manner as described in Example 1, except that the active material composite material was used as the active material. Further, a nonaqueous electrolyte battery was prepared in the same manner as described in Example 1, except that the negative electrode was used.

<Evaluation Method>

(ICP Analysis)

For the active materials (active material composite materials, active material particles, or the like) obtained in the examples and comparative examples, ICP analysis was performed by the aforementioned method. Results are shown in Table 1. Specifically, with regard to Examples 1-10 and Comparative Example 4, shown are the composition of the first phase as the core portion and the composition of the second phase as the shell portion of the active material particles (composite particles). With regard to Comparative Examples 1 and 2, since single-phase active material particles were obtained, the composition of the single phase is shown as the first phase. With regard to Comparative Example 3 in which the mixed powder of the niobium-titanium composite oxide and the niobium oxide was used, for convenience, the first phase and the second phase are not distinguished and are expressed as "mixture".

TABLE 1

| [Table 1] | Method of Attaching Second Phase Precursor onto Core Surface | Composition of First Phase | Composition of Second Phase |
|---|---|---|---|
| Example 1 | Precipitation method | $Nb_2TiO_7$ (Core portion) | $T-Nb_2O_5$ (Shell portion) |
| Example 2 | Precipitation method | $Nb_2TiO_7$ (Core portion) | $T-Nb_2O_5$ (Shell portion) |

TABLE 1-continued

| [Table 1] | Method of Attaching Second Phase Precursor onto Core Surface | Composition of First Phase | Composition of Second Phase |
|---|---|---|---|
| Example 3 | Precipitation method | $Nb_2TiO_7$ (Core portion) | $T\text{-}Nb_2O_5$ (Shell portion) |
| Example 4 | Precipitation method | $Nb_2TiO_7$ (Core portion) | $T\text{-}Nb_2O_5$ (Shell portion) |
| Example 5 | Precipitation method | $Nb_2TiO_7$ (Core portion) | $T\text{-}Nb_2O_5$ (Shell portion) |
| Example 6 | Precipitation method | $Nb_{1.97}Ta_{0.01}V_{0.01}Bi_{0.01}TiO_7$ (Core portion) | $T\text{-}Nb_2O_5$ (Shell portion) |
| Example 7 | Precipitation method | $Nb_{1.99}K_{0.01}Ti_{0.95}P_{0.04}Si_{0.01}O_7$ (Core portion) | $T\text{-}Nb_2O_5$ (Shell portion) |
| Example 8 | Precipitation method | $Nb_{1.98}Na_{0.01}Mg_{0.01}Ti_{0.93}Mo_{0.04}W_{0.03}O_7$ (Core portion) | $T\text{-}Nb_2O_5$ (Shell portion) |
| Example 9 | Precipitation method | $Nb_{1.7}Mo_{0.3}Ti_{0.7}Cr_{0.05}Fe_{0.05}Al_{0.1}B_{0.1}O_7$ (Core portion) | $T\text{-}Nb_2O_5$ (Shell portion) |
| Example 10 | Precipitation method | $Nb_2TiO_7$ (Core portion) | $T\text{-}Nb_2O_5$ (Shell portion) |
| Comparative Example 1 | None | $Nb_2TiO_7$ | None |
| Comparative Example 2 | None | $T\text{-}Nb_2O_5$ | None |
| Comparative Example 3 | None | Mixture of $Nb_2TiO_7$ and $T\text{-}Nb_2O_5$ | |
| Comparative Example 4 | Rolling Fluidized Bed Granulating method | $Nb_2TiO_7$ (Core portion) | $T\text{-}Nb_2O_5$ (Shell portion) |

(X-Ray Diffraction Measurement)

For the active materials obtained in the examples and comparative examples, X-ray diffraction measurement was performed by the above described method. As a result of Rietveld analysis, the crystal structure of the niobium-titanium composite oxide phase was confirmed to be monoclinic, for the active materials obtained in the examples and comparative examples. In addition, it was confirmed that the crystal structure of the niobium oxide was orthorhombic. In addition, the mass ratio of the niobium oxide to the whole active material was calculated. The calculation result of the mass ratio is shown in Table 2 below.

In addition, it was examined whether or not the niobium-titanium composite oxide had been grown in the direction, according to the above-described method. As shown in Table 2 below, the growth of the niobium-titanium composite oxide in the [001] direction was confirmed only in Example 5.

(TEM Observation and Electron Beam Diffraction Measurement)

TEM observation and electron beam diffraction measurement were performed on the active materials obtained in the examples and comparative examples by the above described method. The contact probability between the first (010) plane and the second (010) plane was determined from the measurement results of 100 measurement points X and measurement points Y corresponding thereto, the measurement points X being arbitrary measurement points on the first (010) plane of the niobium-titanium composite oxide that are adjacent to the niobium oxide phase. The contact probability is shown by % in Table 2.

In addition, the presence or absence of the carbon-containing layer was examined by the above-described method. As shown in Table 2, in the examples and comparative examples other than Example 10, the carbon-containing layer had been formed.

With regard to each example and comparative example, the mass ratios of the niobium-titanium composite oxide and the niobium oxide, whether or not the niobium-titanium composite oxide has been grown in the [001] direction, the contact probability between the first (010) plane of the niobium-titanium composite oxide and the second (010) plane of the niobium oxide, and the presence or absence of the carbon-containing layer are summarized in Table 2. It is to be noted that the symbol "-" in Table 2 means "not applicable" to the relevant item.

TABLE 2

| [Table 2] | Mass Ratio of Orthorhombic Niobium Oxide Relative to Entire Active Material Amount (%) | Whether Niobium-titanium Composite Oxide had growth in [001] Direction, or not | Contact Probability between First (010) Plane and Second (010) Plane (%) | Presence or Absence of Carbon-containing Layer |
|---|---|---|---|---|
| Example 1 | 4.8 | No Growth in [001] direction | 25 | Present |
| Example 2 | 9.7 | No Growth in [001] direction | 38 | Present |
| Example 3 | 20.1 | No Growth in [001] direction | 42 | Present |
| Example 4 | 29.4 | No Growth in [001] direction | 40 | Present |
| Example 5 | 4.8 | Has growth in [001] direction | 80 | Present |
| Example 6 | 5 | No Growth in [001] direction | 54 | Present |
| Example 7 | 4.9 | No Growth in [001] direction | 62 | Present |

TABLE 2-continued

| [Table 2] | Mass Ratio of Orthorhombic Niobium Oxide Relative to Entire Active Material Amount (%) | Whether Niobium-titanium Composite Oxide had growth in [001] Direction, or not | Contact Probability between First (010) Plane and Second (010) Plane (%) | Presence or Absence of Carbon-containing Layer |
|---|---|---|---|---|
| Example 8 | 5.1 | No Growth in [001] direction | 60 | Present |
| Example 9 | 4.9 | No Growth in [001] direction | 66 | Present |
| Example 10 | 4.8 | No Growth in [001] direction | 26 | Absent |
| Comparative Example 1 | — | No Growth in [001] direction | 0 | Present |
| Comparative Example 2 | — | — | 0 | Present |
| Comparative Example 3 | 10.5 | No Growth in [001] direction | 12 | Present |
| Comparative Example 4 | 10.3 | No Growth in [001] direction | 18 | Present |

(Measurement of Electrode Capacity)

The single electrode capacity of the negative electrode prepared in each example and comparative example was measured as follows. Each of the negative electrodes obtained by the examples and comparative examples was used as a working electrode, metallic lithium foils were used as a counter electrode and a reference electrode, and the nonaqueous electrolyte prepared by the above described method was used, thereby producing a three-electrode beaker cell.

In the three-electrode beaker cell for the measurement, since lithium metal is used as the counter electrode, the potentials of the negative electrodes produced in the examples and the comparative examples are noble relative to the counter electrode. Thus, these electrodes operate as a positive electrode in the beaker cell. Therefore, the definitions of charging and discharging regarding the negative electrodes is opposite in the beaker cell, as compared to a case where the negative electrodes are used in a nonaqueous electrolyte battery together with the above described positive electrode using lithium nickel cobalt manganese composite oxide as the counter electrode. In order to avoid confusion, here in the present examples, directions in which lithium ions are inserted into the electrode are collectively referred to as charging, and directions of extracting lithium ions from the electrode are consistently referred to as discharging.

The produced beaker cells were charged and discharged in a potential range of from 1.0 V to 3.0 V (vs. Li/Li$^+$) relative to lithium metal electrode standard. A charge/discharge current value was set to 0.2 C (hourly discharge rate), and 0.2 C discharge capacity was examined at room temperature. The value of 0.2 C discharge capacity serves as an index of energy density. The obtained results are shown in Table 3 as single electrode charge/discharge capacity.

(Battery Performance Evaluation)

For the nonaqueous electrolyte batteries prepared in each Example and Comparative Example, the 10-second pulse input-output performance was evaluated. The charge and discharge were performed for 10 seconds each at a current value equivalent to an hourly discharge rate of 2.5 C, within the range of a state of charge (SOC) of 10% to 90% at states of charge of 10% increment. Power (W) that can be input by charging and power (W) that can be output by discharging were obtained for each state of charge, and the 10-second pulse input-output (W/L) was obtained by dividing the powers by the volume (L) of the electrode portion in the prepared battery. The volume of the electrode portion includes the total volume of the positive electrode, the negative electrode, and the separator.

Assuming the 10-second pulse input value at the charge rate of 90% obtained in the nonaqueous electrolyte battery of Comparative Example 1 to be 100% as a reference, and similarly, assuming the output value at the charge rate of 10% obtained in Comparative Example 1 to be 100% as a reference, the ratio of the 10-second pulse input-output value in each example and comparative example (10-second pulse input ratio and 10-second pulse output ratio with respect to Comparative Example 1) was obtained. The obtained results are shown in Table 3.

TABLE 3

| [Table 3] | Single Electrode Charge/discharge Capacity (mAh/g) | 10-second Pulse Input Ratio at SOC 90% (W/L) | 10-second Pulse Output Ratio at SOC 10% (W/L) |
|---|---|---|---|
| Example 1 | 264.5 | 118 | 121 |
| Example 2 | 259.1 | 129 | 131 |
| Example 3 | 247.8 | 132 | 134 |
| Example 4 | 238.2 | 151 | 155 |
| Example 5 | 265.0 | 198 | 185 |
| Example 6 | 262.3 | 152 | 155 |
| Example 7 | 265.9 | 151 | 154 |
| Example 8 | 264.1 | 149 | 151 |
| Example 9 | 265.4 | 155 | 156 |
| Example 10 | 263.5 | 110 | 113 |
| Comparative Example 1 | 269.3 | 100 | 100 |
| Comparative Example 2 | 162.1 | 108 | 110 |
| Comparative Example 3 | 257.6 | 101 | 102 |
| Comparative Example 4 | 256.7 | 102 | 102 |

In the nonaqueous electrolyte batteries prepared in Examples 1 to 10, the 10-second pulse input-output performance was higher than that of the nonaqueous electrolyte batteries prepared in Comparative Examples 1 to 4. In addition, the capacity of the negative electrodes other than the negative electrode of Comparative Example 2, that is, the negative electrodes prepared in Examples 1 to 10 and Comparative Examples 1, 3, and 4 was approximately the same. As described above, in Examples 1 to 10, it was possible to improve the pulse input-output performance while maintaining the high energy density of the niobium-titanium composite oxide.

It is presumed that the reason why the capacity of the negative electrode was lower in Comparative Example 2 than in the other examples and comparative examples is that the niobium-titanium composite oxide was not used in Comparative Example 2, and the niobium oxide alone was used as the electrode active material.

In Comparative Examples 3 and 4, both the niobium-titanium composite oxide and the niobium oxide were included in the negative electrode. Nevertheless, the pulse input-output performance remained at the same level as that of Comparative Example 1 in which the niobium-titanium composite oxide was used alone. In Comparative Example 3, niobium-titanium composite oxide and niobium oxide were simply mixed to obtain a mixed powder. In Comparative Example 4, niobium-titanium composite oxide was coated by using a carbon-containing layer in which niobium oxide was dispersed. In the manufacturing methods of the active materials in Comparative Example 3 and Comparative Example 4, there cannot be obtained particles formed in such a manner that the (010) plane of the niobium-titanium composite oxide and the (010) plane of the niobium oxide are in contact with each other. In these comparative examples, it is presumed that a small number of portions where the (010) plane of the niobium-titanium composite oxide and the (010) plane of the niobium oxide overlap each other had formed by chance. That is, in the comparative examples, there is no connection between the excellent lithium ion conduction path of the niobium oxide and the niobium-titanium composite oxide. It is considered that as a result, migration of lithium between the niobium oxide and the niobium-titanium composite oxide could not be quickly performed, and thus, the pulse input-output performance had not improved.

According to at least one embodiment and example described above, an active material is provided. The active material includes a first phase and a second phase adjacent to the first phase. The first phase includes a niobium-titanium composite oxide. The second phase includes an orthorhombic niobium oxide. The active material is a particle composed having had a second (010) plane of the orthorhombic niobium oxide becoming in contact with a first (010) plane of the niobium-titanium composite oxide in at least a part of a contact interface between the first phase and the second phase.

The active material can realize a secondary battery and battery pack having high energy density and being excellent in pulse input-output performance. In addition, using the active material, there can be provided an electrode that can realize such a secondary battery and battery pack. Furthermore, there can be provided a vehicle having the battery pack installed thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
    a first phase, the first phase comprising a niobium-titanium composite oxide; and
    a second phase adjacent to the first phase, the second phase comprising an orthorhombic niobium oxide,
    the active material being a particle in which a second (010) plane of the orthorhombic niobium oxide is in contact with a first (010) plane of the niobium-titanium composite oxide in at least a part of a contact interface between the first phase and the second phase.

2. The active material according to claim 1, wherein the niobium-titanium composite oxide is represented by a general formula $Li_xTi_{1-y}M1_yNb_{2-z}M2_zO_7$, where in the general formula, $0 \leq x \leq 5$, $0 \leq y < 1$, $0 \leq z < 1$, and M1 and M2 are each independently at least one selected from the group consisting of V, Ta, Fe, Bi, P, Cr, Mo, W, B, K, Na, Mg, Al, and Si.

3. The active material according to claim 1, wherein the active material is a composite particle comprising:
    a core portion, the core portion comprising the first phase; and
    a shell portion on a surface of the core portion, the shell portion comprising the second phase.

4. The active material according to claim 1, wherein 25% or more of the first (010) plane in the contact interface is in contact with the second (010) plane.

5. The active material according to claim 1, wherein a crystal of the niobium-titanium composite oxide has growth in a [001] direction.

6. An electrode comprising the active material according to claim 1.

7. The electrode according to claim 6, wherein the electrode comprises an active material-containing layer comprising the active material.

8. A secondary battery comprising:
    a negative electrode;
    a positive electrode; and
    an electrolyte,
    wherein the negative electrode is the electrode according to claim 6.

9. A battery pack comprising the secondary battery according to claim 8.

10. The battery pack according to claim 9, further comprising:
    an external power distribution terminal; and
    a protective circuit.

11. The battery pack according to claim 9, comprising plural of the secondary battery, wherein the secondary batteries are electrically connected in series, in parallel, or in a combination of in series and in parallel.

12. A vehicle comprising the battery pack according to claim 9.

13. The vehicle according to claim 12, wherein the vehicle comprises a mechanism configured to convert kinetic energy of the vehicle into regenerative energy.

* * * * *